(12) United States Patent
Hiatt et al.

(10) Patent No.: US 10,417,695 B1
(45) Date of Patent: Sep. 17, 2019

(54) METHOD AND SYSTEM FOR DISPLAYING ITEMS PROVIDED BY A MERCHANT

(71) Applicant: AMAZON TECHNOLOGIES, INC., Seattle, WA (US)

(72) Inventors: Jennifer Anne Hiatt, Seattle, WA (US); Alison Louise Cramer, Seattle, WA (US); Kevin Frank Hadder, Seattle, WA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 551 days.

(21) Appl. No.: 15/130,731

(22) Filed: Apr. 15, 2016

(51) Int. Cl.
*G06Q 30/00* (2012.01)
*G06Q 30/06* (2012.01)

(52) U.S. Cl.
CPC ................ *G06Q 30/0643* (2013.01)

(58) Field of Classification Search
CPC ....................................................... G06Q 30/06
USPC ........................................................ 705/26.1
See application file for complete search history.

(56) References Cited

U.S. PATENT DOCUMENTS

2013/0283301 A1* 10/2013 Avedissian ....... H04N 21/44016
  725/5
2014/0337134 A1* 11/2014 Bugenhagen ........ G06Q 10/087
  705/14.57

OTHER PUBLICATIONS

Gamefly, "Checkout", [retrieved on Mar. 8, 2016]. Retrieved from the Internet: <URL: https://www.gamefly.com/#!/checkout/registration>.
Gamefly, "Home Page", [retrieved on Mar. 8, 2016]. Retrieved from the Internet: <URL: https://www.gamefly.com/#!/>.
Gamefly, "MLB The Show 16.", [retrieved on Mar. 8, 2016]. Retrieved from the Internet: <URL: https://www.gamefly.com/#!/game/MLB-The-Show-16/5010023>.
Gamefly, "MLB The Show 16. Pre-Order.", [retrieved on Mar. 8, 2016]. Retrieved from the Internet: <URL: https://www.gamefly.com/#!/game/MLB-The-Show-16/5010023>.

* cited by examiner

Primary Examiner — Mila Airapetian
(74) Attorney, Agent, or Firm — Lindauer Law, PLLC

(57) ABSTRACT

A user interface that facilitates the selection and purchase of an item may be presented on a display. The user interface includes a presentation section and one or more other sections, such as a title section, buy section, alternate image section, package art section, review section, rating section, or other section. The presentation section may extend a full-width of a display or window available for display, while maintaining a desired aspect ratio. Video, slideshows, or other visual information may be played within the presentation section. One or more sections may overlay the presentation section. For example, at least a portion of the buy section may overlay at least a portion of the presentation section.

20 Claims, 17 Drawing Sheets

METHOD AND SYSTEM FOR DISPLAYING ITEMS PROVIDED BY A MERCHANT

BACKGROUND

Media devices such as smartphones, tablets, laptops, televisions, set-top boxes, personal computers, and so forth, may be used to access an online merchant to shop for items.

BRIEF DESCRIPTION OF FIGURES

The detailed description is set forth with reference to the accompanying figures. In the figures, the left-most digit(s) of a reference number identifies the figure in which the reference number first appears. The use of the same reference numbers in different figures indicates similar or identical items or features.

Figure 1:
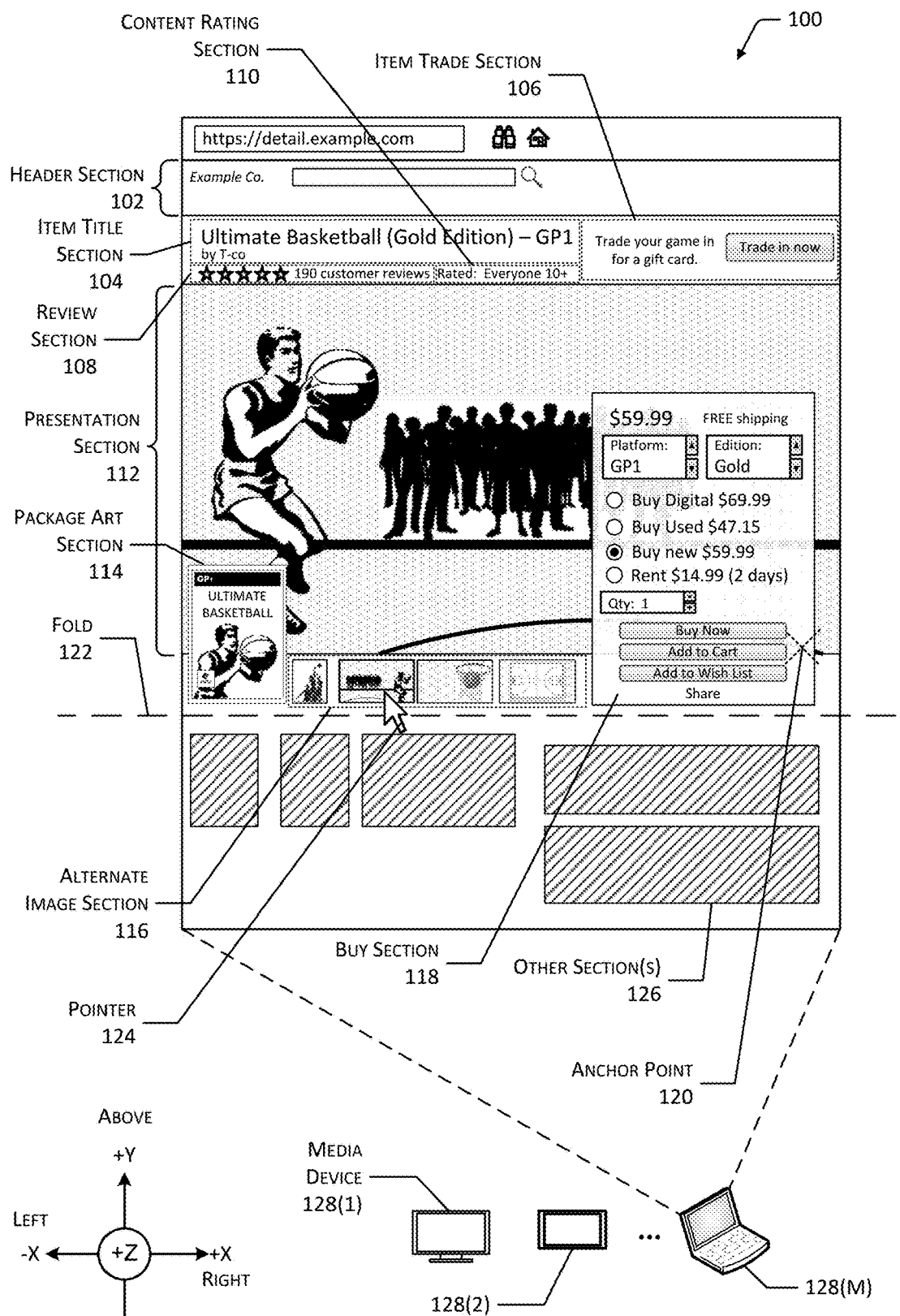
FIG. 1 depicts a user interface presented by a media device that displays a presentation section to present content associated with an item, according to one implementation.

While implementations are described in this disclosure by way of example, those skilled in the art will recognize that the implementations are not limited to the examples or figures described. It should be understood that the figures and detailed description thereto are not intended to limit implementations to the particular form disclosed but, on the contrary, the intention is to cover all modifications, equivalents, and alternatives falling within the spirit and scope as defined by the appended claims. The headings used in this disclosure are for organizational purposes only and are not meant to be used to limit the scope of the description or the claims. As used throughout this application, the word "may" is used in a permissive sense (i.e., meaning having the potential to) rather than the mandatory sense (i.e., meaning must). Similarly, the words "include", "including", and "includes" mean "including, but not limited to".

DETAILED DESCRIPTION

A user may access an e-commerce site, such as provided by an online merchant, to obtain information about items that are available for purchase, rental, lease, and so forth. This access may include a user interface that is presented on one or more media devices. The media devices include, but are not limited to, smartphones, tablets, laptops, televisions, set-top boxes, personal computers, and so forth.

When shopping at a bricks and mortar store, the user may be presented with items resting on the shelf and visual displays associated with the item. For example, the visual displays may comprise signage with information about the item, video monitors, and so forth. The video monitors may present electronic images such as still photos, animations, video, and so forth. For example, a store selling videogames may have different videogames hanging from a pegboard resting on the shelf while video clips depicting gameplay for the different videogames that are available are shown on the video monitors. Because of the size and scope of the physical store, the user may be able to readily see a wide variety of information about an item.

Online shopping traditionally poses greater constraints on the amount of information that may be presented to the user. For example, instead of the various racks of items and video displays, the information presented by an online merchant may be limited to presentation using a few displays of the media devices. Traditionally, this has resulted in a trade-off in which presentation of content associated with the item is severely constrained or requires additional user actions, such as navigating to a different page, activating presentation of video, and so forth which are needed to gain information about the item, in addition to reading relatively large quantities of text.

Described in this disclosure are user interfaces and associated techniques that allow for the presentation of a wide variety of different pieces of information associated with an item in a compact and easy to use configuration. The user interface may display a presentation section within which content that is associated with the item is presented. For example, the item may comprise a videogame, movie, or television show. The content associated with the item may include video of gameplay, trailers, clips of the movie or television show, gameplay of the videogame itself by a user, the movie, the television show, and so forth. In another example, the content associated with the item may comprise still images, slideshows, atmospheric images, environmental images, and so forth. In another example, the item may comprise other items such as household goods, consumer electronics, and so forth. Presentation of the content associated with the item may begin as soon as possible. For example, display of the content by the presentation section may begin once the user interface is loaded and ready for use. The user interface may include other sections that present other information associated with the item. These sections may present information such as title, purchasing information, package art, reviews, content rating, and so forth.

The presentation section may be presented at a full width of the user interface. For example, where the user interface extends to boundaries of a display device, the presentation section may extend from a left side of the display device to a right side of the display device. The height of the presentation section is such that the desired aspect ratio of the content that is displayed is maintained. For example, where the item is a videogame, and the presentation section displays video of gameplay, the ratio of the width to the height may be maintained at 16:9.

In one implementation, the user interface may include a buy section that presents information associated with purchasing or obtaining other rights associated with the item. The buy section may overlay at least a portion of the presentation section. The buy section may be at least partially transparent, such that at least a portion of the presentation section is visible. For example, the buy section may have transparency of about 10% or less.

A package art section may comprise one or more images depicting packaging associated with the item. For example, the package art section may comprise the graphics that would be printed and presented on the front of the box containing the item. The package art section may overlay at least a portion of the presentation section.

Additional information may be presented responsive to one or more user input events. User input events may include but are not limited to one or more of a touch event, a mouse click, a mouse over, a key press, a verbal command, an accelerometer input, a gaze direction, a gesture, and so forth. For example, a touch event on a content rating section may present reviews or portions thereof that provide discussion about a content rating that is associated with the item. In another example, a touch event on the content rating section may present portions of the content that are associated with a content rating of the item. Continuing the example, the portions of the content that have been designated as being responsible for or indicative of a "mature" rating for a videogame may be presented in the presentation section. As a result, the user may readily see what within the videogame resulted in the rating that was assigned therewith, allowing the user to more easily determine if the item is of interest to them.

The presentation section and one or more other sections such as the buy section, a review section, a content rating section, a trade section, and so forth, may be presented "above the fold" and that these sections are visible on the display device without requiring the user interface to be scrolled.

The user interface may be adjustable to varying sizes. For example, the user interface may comprise a graphical user interface with one or more windows. As the window is resized, the sections within the user interface may be rearranged or resized accordingly. For example, the presentation section may be configured to resize such that it maintains the full width of the window.

The user interface may use various techniques to provide for the overlay effect, in which one section appears to overlap or overlay another section. For example, where the user interface is presented responsive to hypertext markup language (HTML) tags using cascading style sheets (CSS), sections may be associated with one or more CSS layers. For example, a section that is assigned to a layer value of "−1" when presented on a display may appear to be "beneath" a layer having a value of "+2". In one implementation, each section may be associated with a different layer. In another implementation, two or more sections may be associated with a particular layer. Sections appearing within a particular layer may be assigned a transparency value that affects how much of an image of an underlying layer is visible. For example, a transparency value of "0" may mean that the section is opaque.

By using the user interface described herein, the user may be quickly and easily presented with a wide variety of information about an item. For example, video clips displayed in the presentation section provide a wealth of information about the item while other sections such as the buy section allow the user to initiate or complete a transaction with respect to the item. The user interface improves the ability of the computer to display information and interact with the user through the particular sections described in this disclosure. As a result, the user is able to readily gather information about the item, and act to purchase or otherwise acquire rights to the item. The claims in this application solve problems of prior graphical user interfaces in the context of media purchases (e.g., videogame purchases) relating to speed, accuracy, usability, content suitability (e.g., parental controls), addressing questions the user may have, eliminating doubts about the online purchase, and so forth. For example, the additional information about reviews and the media purchase may more easily allow a parent to find content which they believe is suitable for presentation to their child.

Illustrative Systems

FIG. 1 depicts a user interface 100. The user interface 100 is depicted by way of illustration and not necessarily as a limitation as being provided within a window of a web browser.

The user interface 100 may comprise a graphical user interface (GUI) with a plurality of presentation elements designated as sections. Each section comprises an area within the user interface 100 within which information of a particular type or category may be presented. For ease of illustration and not necessarily as a limitation, the sections are depicted as generally rectangular or square in shape. In other implementations, not depicted herein, the sections may have a perimeter that describes an irregular shape, regular polygon, and so forth. Each section may be associated with a particular layer.

Layers within the GUI allow for different sections to be grouped or segregated in a fashion that is convenient for the presentation. Layers may be conceptually visualized as a sheaf of sheets residing atop one another, such as in a stack of paper. In addition to the two dimensional coordinates for particular elements such as a pixel presented on a display, each layer may be designated by a particular value. For example, the horizontal and vertical coordinates of a pixel may be expressed as a value along X and Y axes, respectively, while the layer is expressed as a Z axis value. Various attributes of the layer and the elements therein may be specified. For example, a section within a particular layer may be assigned a transparency or opacity value that allows control over whether underlying sections are visible through the section.

Layers may be utilized in a variety of programming environments. The user interface 100 may be described using tag-based language, such as Hypertext Markup Language (HTML) or eXtensible Markup Language (XML) in conjunction with cascading style sheets (CSS). Using specific tag values, a layer may be assigned a particular position with respect to the z-axis. For example, the "z-index" tag may be used to specify a particular position within a stack of layers. Layers may be controlled to render them visible, hidden, specify their position with respect to other layers, and so forth.

For ease of description, and not necessarily as a limitation, three mutually orthogonal axes are depicted. An X axis is horizontal with respect to the user interface 100, a Y axis is perpendicular to the x-axis and is generally vertical with respect to the user interface 100. A z-axis is orthogonal to the X and Y axes. Terms may be used to indicate a relative position with respect to these axes. For example left and right indicate a relative position with respect to the x-axis, above and below indicate a relative position with respect to the Y axis, and front and behind indicate a relative position with respect to the z-axis.

The user interface 100 may be used to provide information about one or more items that are available to a user for use, purchase, rental, lease, and so forth. For example, the user interface 100 may provide information about an item available from a library that may be checked out at no charge to the user. In another example, the user interface 100 may provide information about an item available for sale from a merchant. The item may comprise a physical item such as a toaster, tablet computer, videogame sold by way of a pre-packaged computer readable storage medium, movie or television show sold by way of a prepackaged computer readable storage medium, and so forth. The item may also comprise an electronically transferable item, or rights associated therewith. For example, the item may include a license to access a streaming video of the movie, to play a videogame, and so forth.

To provide information associated with the item, the user interface 100 may include one or more sections. One or more of the sections may be responsive to one or more user input events. User input events may include but are not limited to one or more of a touch event, a mouse click, a mouse over, a key press, a verbal command, an accelerometer input, a gaze direction, a gesture, and so forth. A user input event associated with a particular section may result in one or more of a change in the user interface 100 or initiation of an action.

A header section 102 is depicted in the user interface 100. The header section 102 may include information such as a company or organization name, logo, search box, and so forth. For example, the header section 102 may indicate a category of items that are being presented elsewhere in the user interface 100. In some implementations, the header section 102 may be responsive to a user input event. For example, a mouse over of the header section 102 may result in presentation of other categories of items.

An item title section 104 provides information indicative of a name or title associated with an item. For example, where the item comprises a videogame the item title section 104 may include information such as the name of the videogame, manufacturer, and so forth. In some implementations the item title section 104 may be responsive to user input. For example, a mouse over of the item title section 104 may result in presentation of additional information such as a date the item was made available, contact information for the manufacture, and so forth.

An item trade section 106 provides information associated with trading one item for another, or trading an item for remuneration. For example, the item trade section 106 may provide item trade-in options and other information about an estimated trade-in value for a used item presented in the user interface 100. The item trade section 106 may include one or more controls, such as a "trade-in now" button. Activation of this button by a user input event may result in a presentation of additional information within the user interface 100, presentation of another user interface, and so forth.

A review section 108 presents information indicative of reviews associated with the item. For example, the review section 108 may comprise a summary of ratings such as a number of stars or other icons that reflect an average rating by other users. A small number of stars, such as zero, may indicate a low rating while a high number of stars, such as five, may indicate a high rating. In some implementations, other information may be presented, such as a number of reviews associated with the item that are available.

The review section 108 may be responsive to a user input event. For example, a touch event that is associated with the review section 108 may result in the presentation of at least a portion of the reviews that are associated with the item.

The reviews presented in the review section 108 may be selected based at least in part on preferences associated with the user, previous actions of the user, history of items viewed, and so forth. For example, a particular user may prefer to see negative reviews first, or may prefer to see reviews that focus on the realism of the athleticism depicted in the interactive videogame. As a result, the user is more easily presented with information that is of particular use to them.

A content rating section 110 displays information indicative of a content rating associated with the item. For example, where the item comprises a movie, the content rating section 110 may display information of a rating provided by the Motion Picture Association of America (MPAA) for the item. In another example, where the item comprises a videogame, the content rating section 110 may display information of a rating provided by the Entertainment Software Rating Board (ESRB).

The content rating section 110 may be responsive to a user input event. For example, a mouse click event that is associated with the content rating section 110 may present additional information associated with the rating. Presentation of the additional information is discussed in more detail below with regard to FIG. 3.

The user interface 100 may also include a presentation section 112. The presentation section 112 displays content associated with the item. The content presented may include one or more of a video clip, video stream, one or more still images, slideshow, mosaic, and so forth. In some implementations, the video clip may be streamed to minimize delays associated with presentation. In other implementations, the video stream may comprise pre-recorded video, "live" or contemporaneous video, and so forth. For example, the video stream may comprise video having a duration that is longer than the video clip. The content may include corresponding audio, subtitles, and so forth. In one example where the item comprises a movie, the content may comprise a clip of the movie, theatrical trailer for the movie, and so forth. In another example where the item comprises a videogame, the content may comprise clips obtained from gameplay of the videogame, a stream of live gameplay of the videogame by another user, and so forth. In yet another example, where the item comprises a physical good such as a toaster, the content may comprise a video review or sales presentation about the toaster.

The presentation section 112 may be configured to maintain a full width of the user interface 100, or a particular window therein. For example, the presentation section 112 may extend a full width of the user interface 100, such as from side to side of a window. A height of the presentation section 112 may be selected that maintains a predetermined aspect ratio associated with the content. For example, where the content is video presented in a 16:9 aspect ratio, the height of the presentation section 112 may be adjusted to maintain this predetermined aspect ratio.

The presentation section 112 may be configured to encompass a majority of the area within the user interface 100. For example, as depicted in FIG. 1, the presentation section 112 dominates the user interface 100. In some implementations, the presentation section 112 may encompass a total area that is greater than or equal to 50% of that provided in the user interface 100.

The presentation section 112 may be responsive to a user input event. For example, when the item is a videogame a user input event such as a mouse click within the presentation section 112 may result in an instantiation of an interactive gaming session. The gaming session may then be presented within the presentation section 112. Continuing the example, following the mouse click, the user may be able to engage in interactive gameplay to play at least a portion of the videogame within the presentation section 112. This is described in more detail below with regard to FIG. 4.

A package art section 114 may be presented within the user interface 100. The package art section 114 may comprise one or more images depicting packaging associated with the item. For example, the package art section may comprise the graphics that would be printed and presented on the front of the box containing the item. The package art section may overlay at least a portion of the presentation section 112. For example, as depicted here in the user interface 100, the package art section 114 is arranged proximate to a left edge of the presentation section 112.

The package art section 114 may be responsive to user input events. For example, a touch event within the boundary of the package art section 114 may result in the presentation of a different side of the packaging of the item, such as a rear panel of the item.

An alternate image section 116 displays one or more additional images associated with the item, or the content that is associated with the item. Each of the additional images within the alternate image section 116 may be associated with a different point within a video clip, a video stream, different video clip, and so forth. The alternate image section 116 may be responsive to user input events. A touch event or mouse click associated with a particular image within the alternate image section 116 may present the content associated with that image. For example, where the item comprises a videogame, touching the first image within the alternate image section 116 may present a video clip provided by the manufacturer that shows various scenes of gameplay. Touching the second image within the alternate image section 116 may present a clip of a video stream obtained while end-users were playing the game. Touching the third image within the alternate image section 116 may jump to a particular section within that clip of the video stream, such as a portion that has been deemed to be of particular interest.

User input events associated with the presentation section 112, the alternate image section 116, or both may be used to determine the content that is presented in the presentation section 112. For example, the user input event indicative of a mouse pointer hovering over a particular character depicted in the presentation section 112 or the alternate image section 116 may result in the presentation section 112 presenting different content. This different content may comprise a video clip, portion of a video clip, or other information associated with the particular character that was depicted. In this way, the user may see more about the item as it relates to that particular character.

A buy section 118 may be presented within the user interface 100. The buy section 118 comprises information associated with the acquisition of the item or rights associated therewith. For example, the buy section 118 may present information and controls associated with purchasing the item. In some implementations, the buy section 118 may be anchored at an anchor point 120 relative to the presentation section 112. For example, a first point of the presentation section 112 that is proximate to a lower right corner of the presentation section 112 may be designated as an anchor point 120. In another example, the first point of the presentation section 112 that is proximate to an upper right corner of the presentation section 112 may be designated as the anchor point 120. In this figure, a second point of the buy section 118 that is proximate to a lower right corner of the buy section 118 may be anchored to this first point that is proximate to the lower right corner of the presentation section 112. In another example, the second point of the buy section 118 that is proximate to an upper right corner of the buy section 118 may be anchored to the first point proximate to the upper right corner. In other implementations, other points of the presentation section 112, buy section 118, and so forth, may be used as anchor points 120. Should the user interface 100 or portion thereof be resized, the relative position of the buy section 118 with respect to the presentation section 112 will remain fixed at this anchor point 120. The buy section 118 may be at least partially transparent with respect to the presentation section 112. For example, as depicted here the buy section 118 is approximately 10% transparent allowing for least some details that are displayed in the presentation section 112 to be visible to the user. The buy section 118 is described in more detail below with regard to FIG. 5.

A broken line depicts a fold 122 in the user interface 100. In order for the user to view the content that is below the fold 122, they would need to scroll. Positioning of displayed items in the user interface 100 above or below the fold 122 is described in more detail below with regard to FIG. 9. The sections described so far are configured to appear "above the fold" with respect to the user interface 100. For example, the review section 108, the presentation section 112, and the buy section 118 all appear above the fold 122.

Also depicted in the user interface 100 may be a pointer 124. The pointer 124 comprises a graphical indicator as to the location with respect to the user interface 100 specified by an input device such as a mouse, digitizer pad, and so forth. In some implementations the pointer 124 may be visible. In other implementations, the pointer 124 may be hidden or omitted.

The user interface 100 may include one or more other sections 126. For example, the other sections 126 may include information indicating other items that may be of interest to the user, items that are commonly associated with purchase of the item that is currently displayed, and so forth.

The user interface 100 may be presented using one or more media devices 128. The media devices 128 may include, but are not limited to, smartphones, tablets, laptops, televisions, set-top boxes, personal computers, and so forth. In some implementations, the user interface 100 or portions thereof may be presented using a plurality of media devices 128. For example, a first portion of the user interface 100 may be presented on a first media device 128(1), while a second portion of the user interface 100 is presented on a second media device 128(2).

Figure 1B:
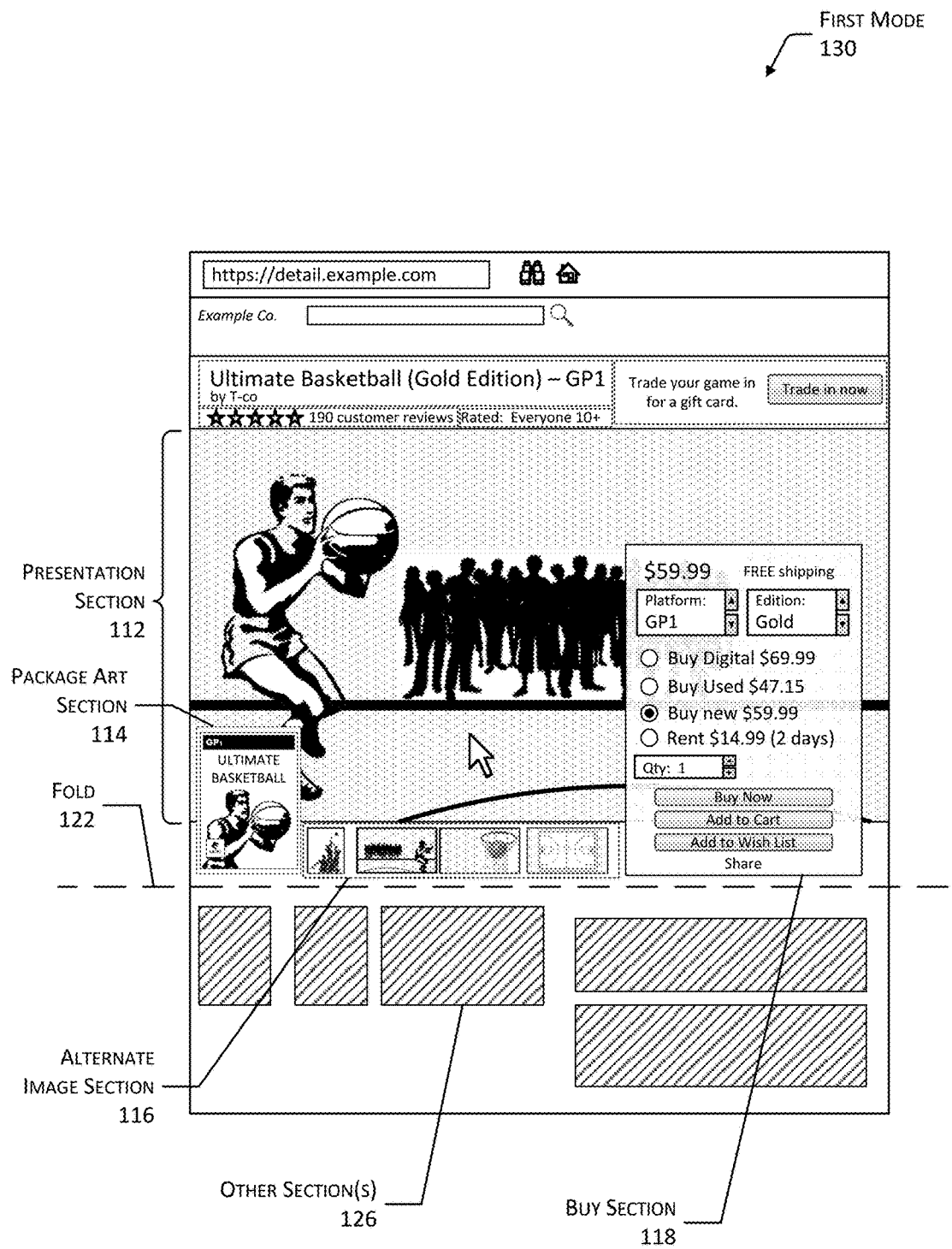
FIGS. 1B and 1C depict a transition between two modes of a user interface, according to one implementation.
Figure 1C:
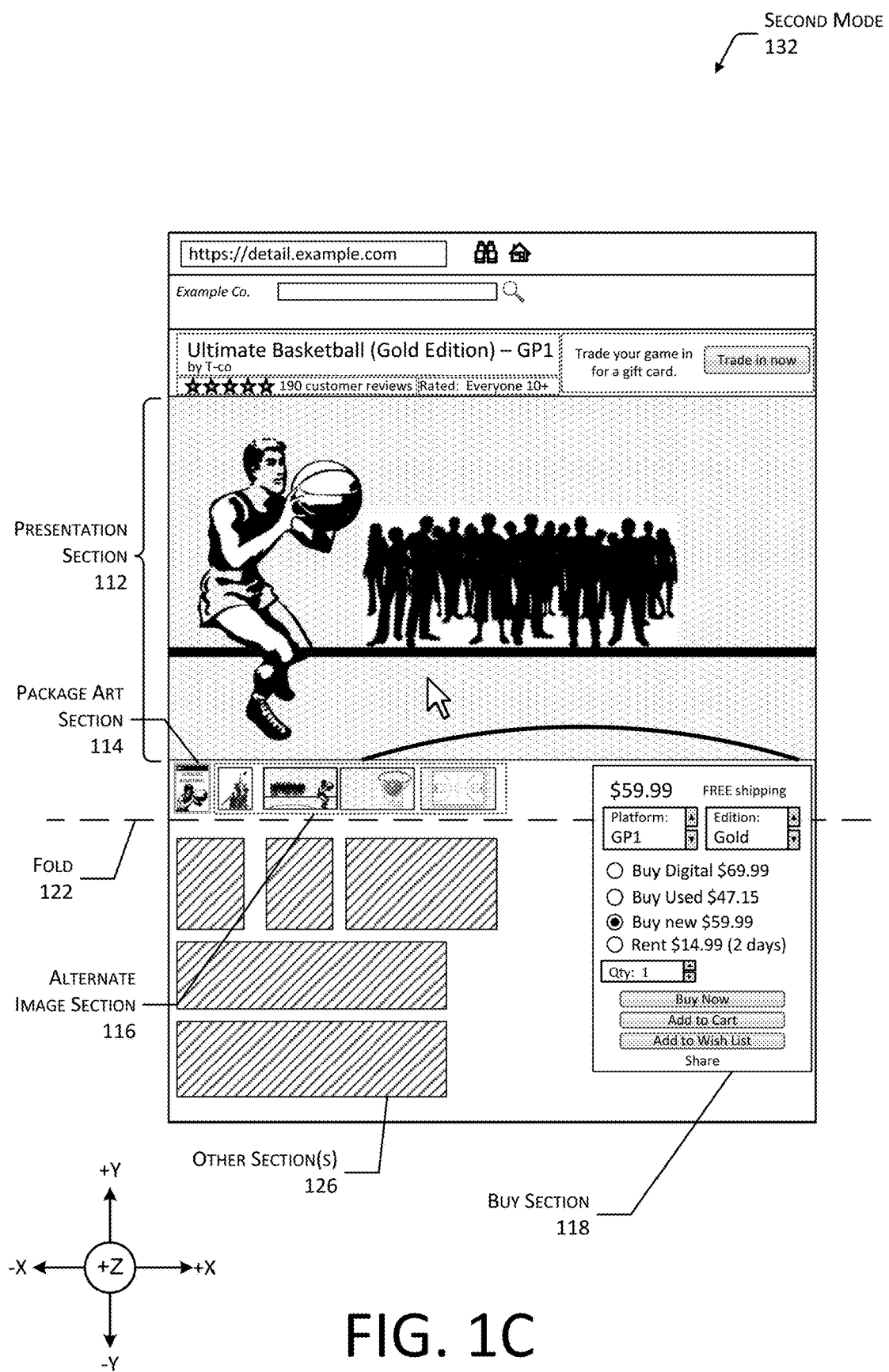

FIGS. 1B and 1C depict a transition between a first mode 130 and a second mode 132 of the user interface 100, according to one implementation. The transition between these modes may be responsive to a user input event. For example, a user input event may include, but is not limited to, a mouse click, scroll input, keyboard input, gaze fixation to or away from on a particular point within the user interface 100, user gesture, facial expression, and so forth.

In the first mode 130, the buy section 118, the package art section 114, and the alternate image sections 116 are as described above with respect to FIG. 1. For example, the package art section 114 and the buy section 118 overlay at least a portion of the presentation section 112.

Responsive to the user input event, the user interface 100 may be transitioned from the first mode 130 to the second mode 132 depicted in FIG. 1C. In FIG. 1C, the relative size or area of the package art section 114 has been reduced and now no longer overlays the presentation section 112. The buy section 118 may be moved and now does not overlay the presentation section 112. As a result, the presentation section 112 is left unobscured by any other sections. At least a portion of the buy section 118 may extend below the fold 122 in one or both modes. The size or area of the package art section 114 may be comparable at least in one dimension, such as height or width, to images in the alternate image section 116. For example, the package art image may have a same pixel width as the images in the alternate image section 116. The other sections 126 may be moved, relocated, omitted, or concealed beneath the buy section 118 when in the second mode 132. Likewise, upon another user input event, either the same or different, the user interface 100 may transition from the second mode 132 to the first mode 130.

The transition between the first mode 130 and the second mode 132 may include animations, graphical effects, and so forth. In one example, the transition may be abrupt. In another example, the transition may include animations to show the various sections shrinking or growing.

The various sections described in the user interface 100 in this disclosure may overlap with one another. For example, the review section 108 may overlap or be presented within the boundaries of the buy section 118 (not shown).

Figure 2:
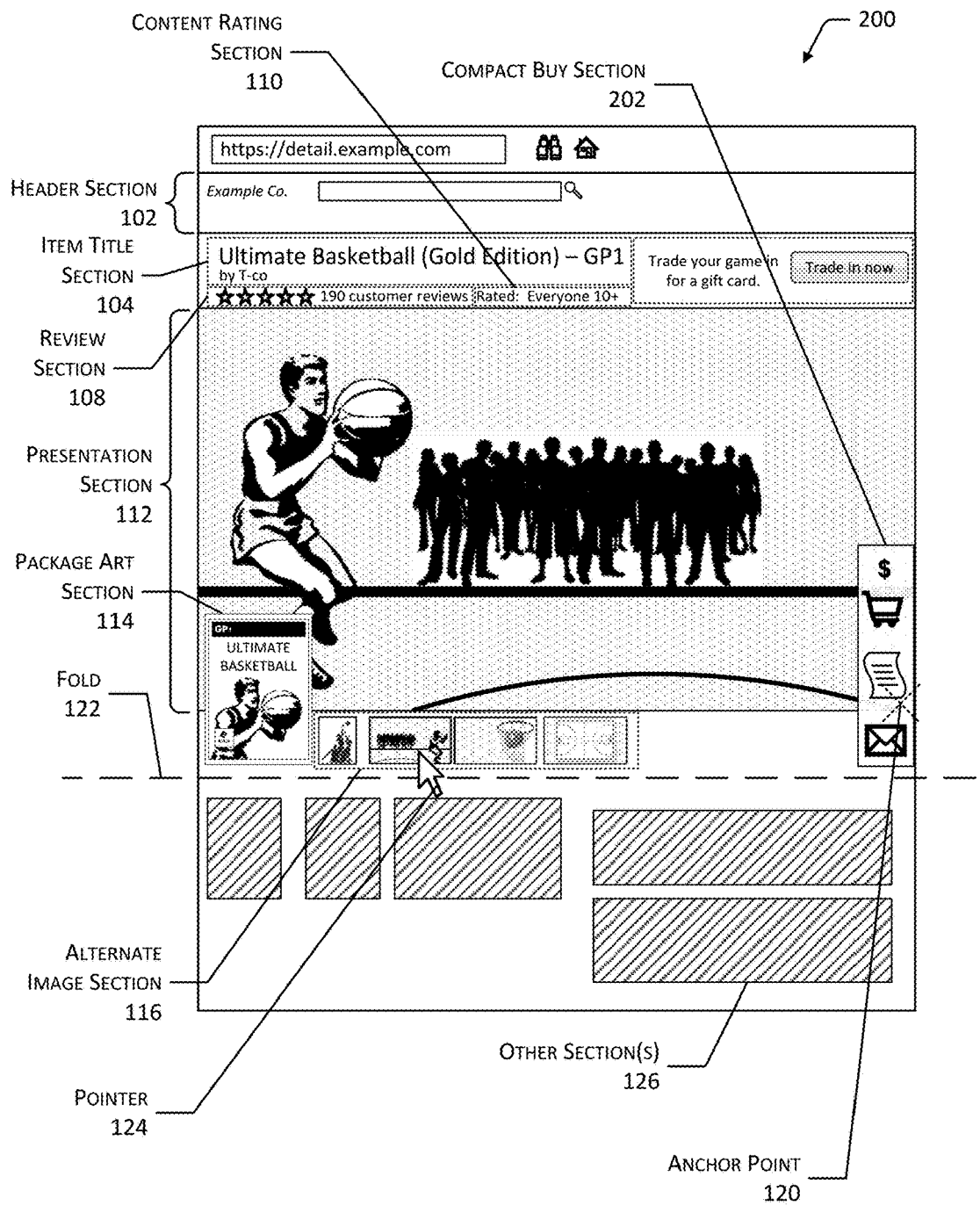
FIG. 2 depicts another user interface presented by the media device that displays a presentation section to present content associated with an item and a compact buy section, according to one implementation.

FIG. 2 depicts another user interface 200 presented by the media device 128. In this illustration, a compact buy section 202 is presented in place of the buy section 118. The compact buy section 202 exhibits an area within the user interface 200 that is less than that utilized by the buy section 118. One or more portions of the compact buy section 202 may be responsive to user input events.

The compact buy section 202 may present one or more icons that are associated with acquisition of the item or rights thereto. For example, the compact buy section 202 may include a currency icon that presents pricing information upon the occurrence of the user input event such as a touch event or mouse click. In another example, the compact buy section 202 may include a shopping cart icon that allows for the item to be added to a shopping cart associated with the user interface 200 session. In yet another example, the compact buy section 202 may include a wish list icon that allows for the item to be added to a wish list of items for potential purchase at a later time. In still another example, the compact buy section 202 may include messaging or social media icons that allow the user to post messages to a social media website, send an email, send a text message, and so forth.

The compact buy section 202 may be anchored to the anchor point 120 such as described above. For example, a lower right portion of the compact buy section 202 may be anchored to a point corresponding to a lower right portion of the presentation section 112.

In some implementations, the user interface 200 may transition between the buy section 118 and the compact buy section 202. For example, the user interface 200 may initially depict the compact buy section 202 having a first area. A user input event may be determined as associated with the compact buy section 202, such as a mouse over event. Responsive to the user input event, the display may transition from presenting the compact buy section 202 to presenting the buy section 118. The buy section 118 has a second area within the user interface 200 that is greater during display than the first area of the compact buy section 202. Similarly, another user input event or a discontinuation of the user input event may result in a transition from the display of the buy section 118 to the compact buy section 202. The compact buy section 202 allows the user of the user interface 200 to maintain accessibility to at least some of the functions associated with acquiring rights to the item while minimizing the obscuration of the presentation section 112.

In some implementations, responsive to a user input event, the user interface may toggle between presenting the buy section 118 and the compact buy section 202. Placement of the buy section 118 and the compact buy section 202 within the user interface may vary. For example, the compact buy section 202 may be presented above the fold 122, while the buy section 118 may be presented below the fold 122.

Figure 3:
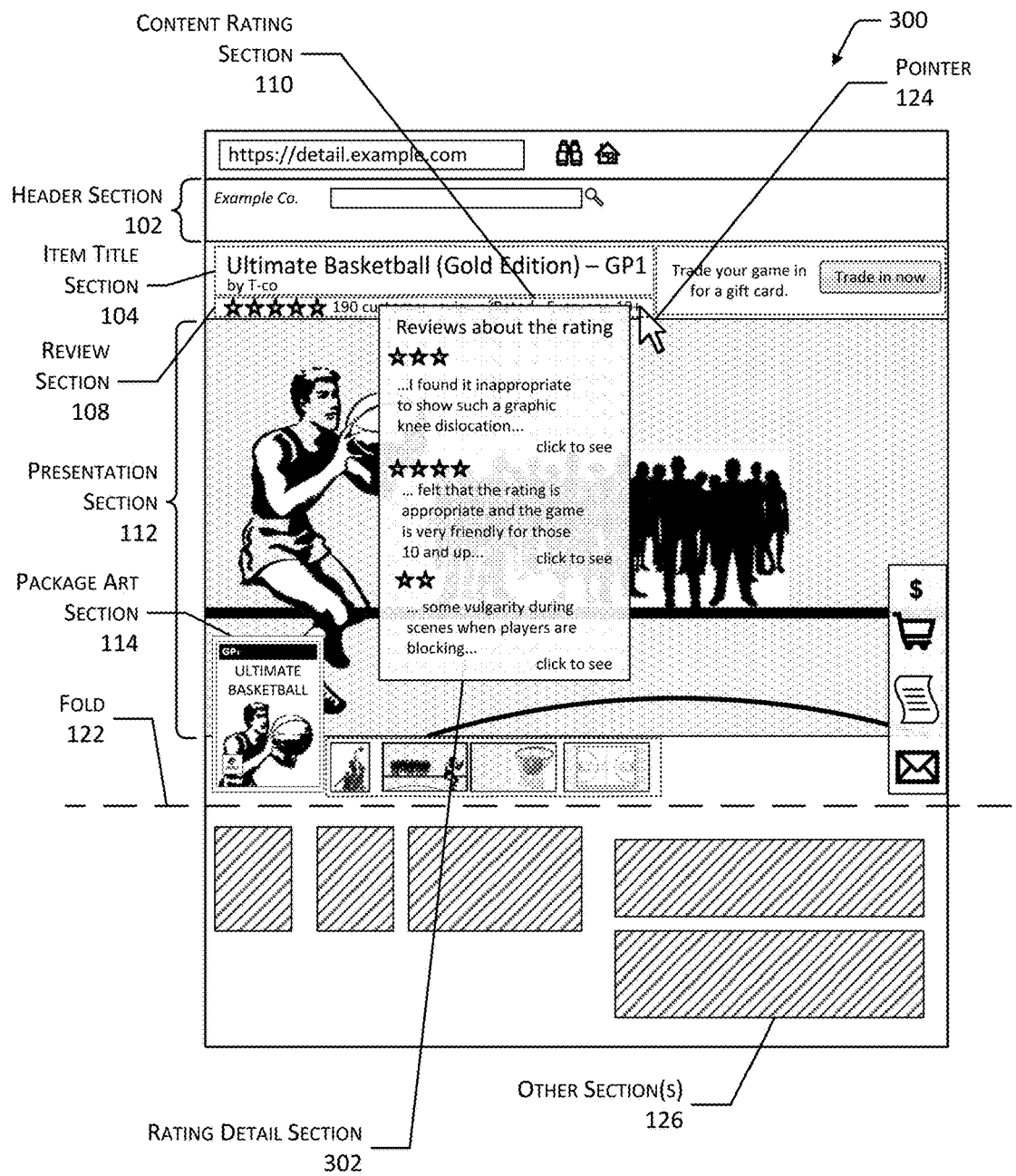
FIG. 3 depicts another user interface presented by the media device that displays a presentation section to present content associated with an item and a rating detail section, according to one implementation.
Figure 3:
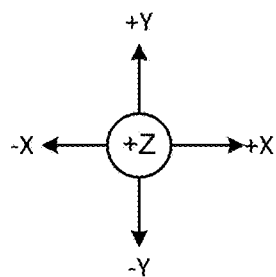

FIG. 3 depicts another user interface 300 presented by the media device 128. The user interface 300 depicts the results of the user input event associated with the content rating section 110. For example, after a mouse click or touch event within the content rating section 110, a rating detail section 302 may be presented.

The rating detail section 302 may include at least a portion of the reviews that are associated with the item and which provide information relevant to a content rating of the item. For example, the rating detail section 302 may include a subset of all reviews for the item, the subset having been filtered to identify reviews that discuss whether the assigned content rating was accurate, inaccurate, and so forth.

In some implementations, one or more portions of content associated with the item may be presented that are representative of how the particular content rating was determined for the item. For example, where the item comprises a videogame and the rating indicates an ESRB rating of "Everyone 10+", video clips of the videogame (or portions thereof) that depict violence, mild language, crude humor, that were considered definitive in the assessment "Everyone 10+" rating may be presented within the presentation section 112. In this way, the user may readily determine if they are comfortable with the item and what it portrays.

Presentation of these portions that are representative of the content rating may be played automatically upon user input to the content rating section 110, upon user input associated with a rating detail section 302, and so forth. For example, as depicted here one comment indicates there is some vulgarity presented during gameplay. The user may provide a user input event such as a mouse click or touch on a control associated with this comment. Responsive to the user input event, a portion of the videogame that includes the vulgarity reference in the comment may be presented.

The portions of the content that are presented may be obtained from the ratings body that provided the content rating, users, and so forth. For example, the ESRB may provide a video capture of the gameplay during testing that has been annotated with tags indicative of particular events such as vulgarity, crude humor, and so forth.

Display of content and the presentation section 112 may be limited based on parental controls or other settings associated with an account. For example, the presentation section 112 as presented when an account that is associated with a child under the age of 18 is logged in may be limited to presenting content appropriate to that age. Continuing the example, the minor child may be unable to use their account to view content with an ESRB rating of "mature".

Figure 4:
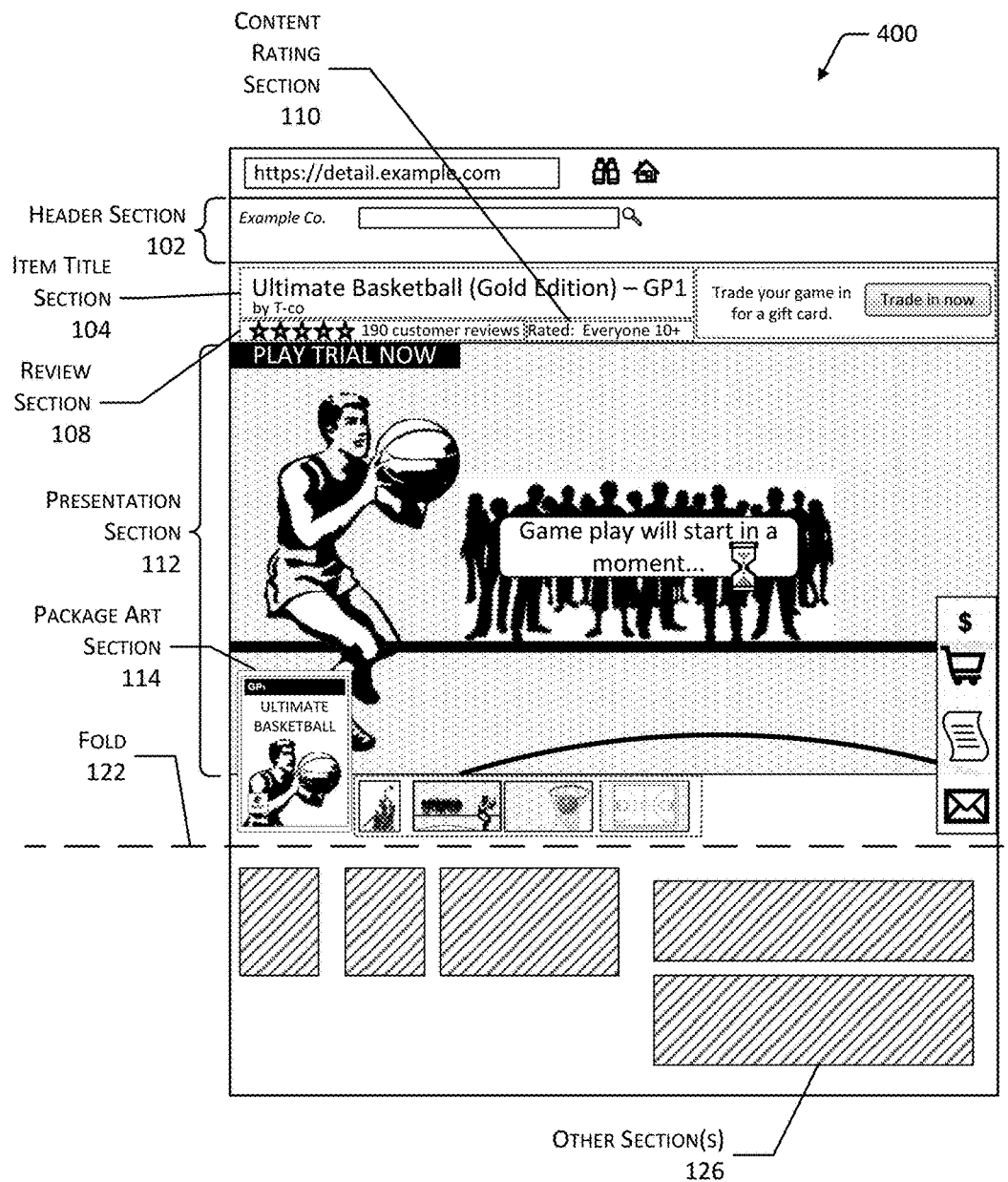
FIG. 4 depicts another user interface presented by the media device that displays a presentation section to present an interactive gaming session, according to one implementation.
Figure 4:
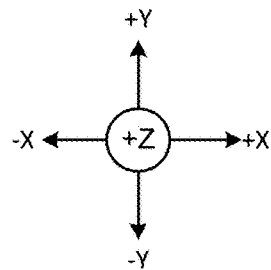

FIG. 4 depicts another user interface 400 presented by the media device 128. The user interface 400 depicts the results of the user input event associated with the presentation section 112 when the item is a videogame. Responsive to the touch event within the presentation section 112, an interactive gameplay session may be instantiated. When ready, the interactive gameplay may be presented within the presentation section 112. For example, the user may be able to interactively play the videogame within the user interface 400. The interactive gameplay session may be for a subset or portion of the entire videogame. For example, the interactive gameplay session may be limited to a trial version or a single level.

During or after conclusion of the interactive gameplay session, the user may activate other controls or otherwise interact with the other elements within the user interface 400. For example, the user may activate the shopping cart control in the compact buy section 202 to add the item for purchase.

Figure 5:
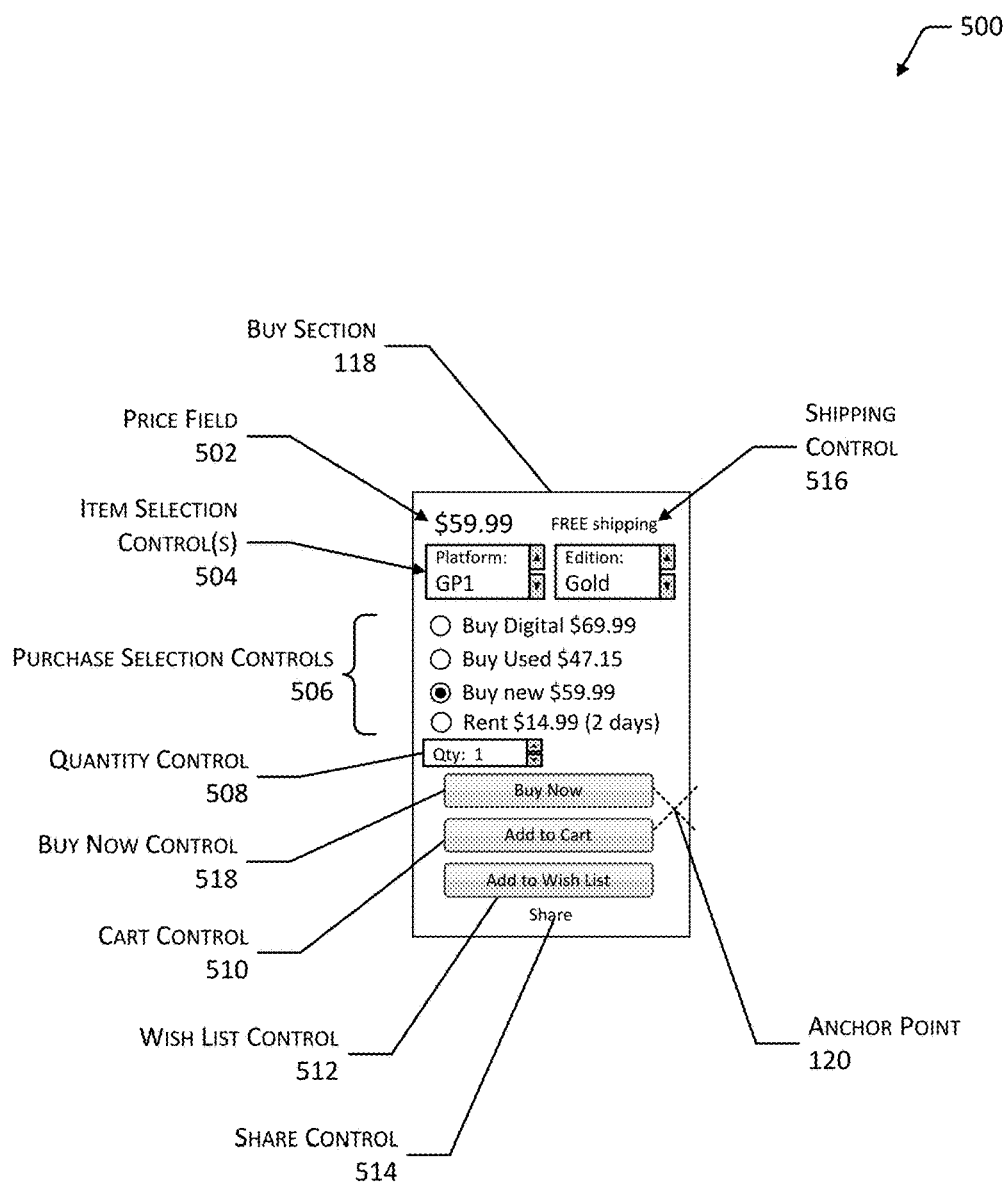
FIG. 5 depicts a detailed view of the buy section, according to one implementation.
Figure 5:
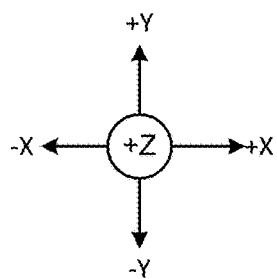

FIG. 5 depicts a detailed view 500 of the buy section 118, according to one implementation. The buy section 118 may include one or more of the following fields or controls.

A price field 502 comprises information indicative of a cost to acquire rights to the item. For example, the price field 502 includes purchase price of the item. In some implementations, there may be different versions or editions of an item. An item selection control 504 allows the user to select from among these different versions. For example, the item selection controls 504 allow the user to select between versions of the game console that the videogame will run on.

Purchase selection controls 506 allow the user to select from among different options to purchase or otherwise acquire rights to the item. For example, the purchase selection controls 506 allow the user to buy different versions, rent, and so forth. The quantity control 508 allows the user to specify a quantity of items desired. A buy now control 518 allows for expedited purchase to be initiated. For example, activation of the buy now control 518 may result in a purchase using a previously stored default payment method to a previously stored default shipping location. A cart control 510 allows the user to place the item with the associated selections into a shopping cart for later completion of the purchase. A wish list control 512 allows the user to add the item with the associated selections to a list for potential future purchase. A share control 514 may allow the user to share information about the item by way of a social media site, text message, email, and so forth. A shipping control 516 allows the user to specify a particular shipping method. For example, the user may select a free shipping option, an expedited shipping option, a delayed shipping option, and so forth.

In some implementations, portions of the user interface may be provided by third parties. For example, a third party provider may have user input controls and output elements presented within the buy section 118 or elsewhere in the user interface.

Figure 6:
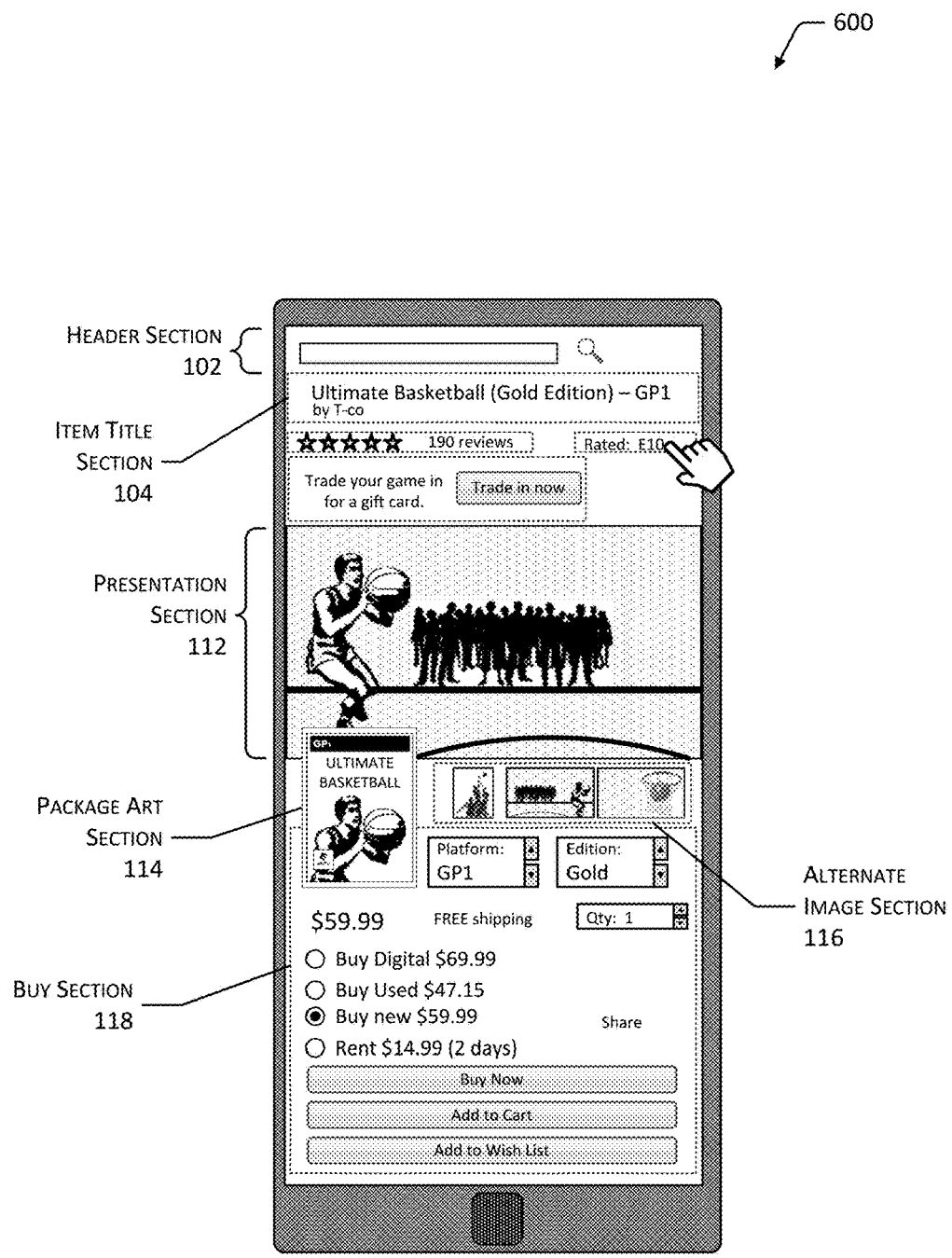
FIG. 6 depicts another user interface presented by the media device that displays the presentation section to present content associated with an item, according to one implementation.

FIG. 6 depicts another user interface 600 presented by a media device 128. In this illustration, the media device 128 may comprise a smaller form factor device, such as a smart phone or tablet computer. In this implementation, arrangement of sections may differ as compared to the previous versions of the user interfaces presented above. For example, the presentation section 112 occupies at least 25% of the area of the user interface available on the display screen, and extends from a left edge to a right edge of the display device. The buy section 118 is positioned below the presentation section 112, and is not otherwise anchored to the presentation section 112.

In some implementations, the user interface 600 may adapt based upon rotation of the media device 128. For example, the user interface 600 is depicted here is in a portrait mode. Upon rotation into a landscape mode, the user interface may adjust accordingly. For example, the presentation section 112 may occupy an area extending from the left edge of the display to approximately two thirds of the distance from the left edge to the right edge of the display. In another example, the presentation section 112 may occupy an area extending from the left edge of the display to the right edge of the display, and the buy section 118 may overlay at least a portion of the presentation section 112 such as described above.

Figure 6B:
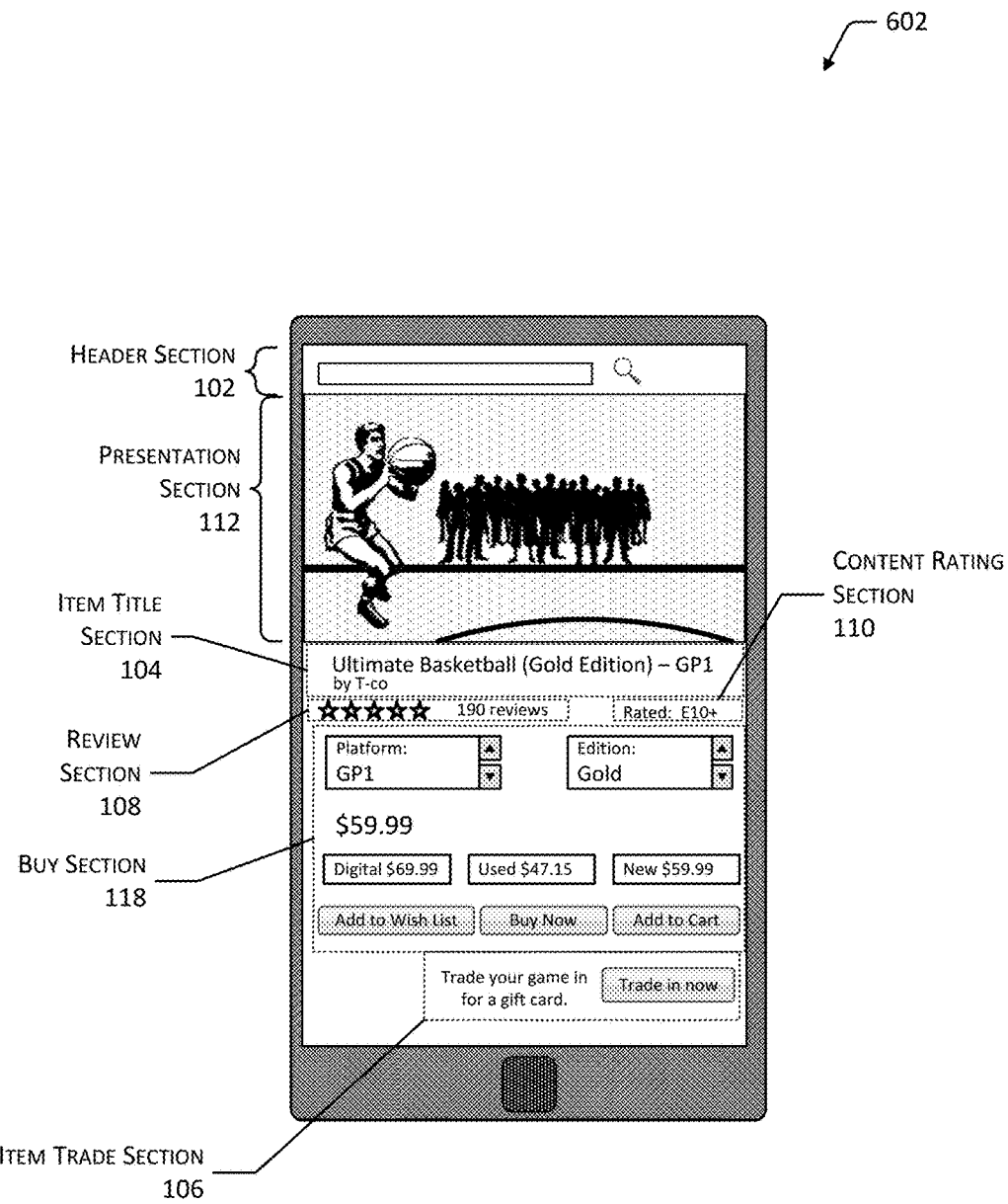
FIG. 6B depicts another user interface presented by the media device, according to one implementation.
Figure 6B:
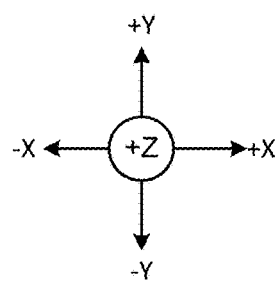

FIG. 6B depicts another user interface 602 presented by the media device 128, according to one implementation. In this illustration, some of the sections are in different positions relative to FIG. 6. For example, the item title section 104 is below the presentation section 112. In this and the other figures, the various elements of the buy section 118 may change. For example, while the wish list control 512, buy now control 518, and the cart control 510 are depicted, other controls such as a rent control (to allow for rental of the item) may not be presented. The selection of various elements presented in a section may be based on other data, such as merchant preferences, which options to acquire the item are available, and so forth. For example, the rent control may not be presented when no rental is available.

Other aspects of the sections may be customized based on the use of the media device 128 to present the user interface, information about the item, and so forth. For example, for an item such as a game that is typically sold in individual quantities of one, the quantity control 508 may be omitted.

Other sections may be included, such as the item trade section 106, the review section 108, the content rating section 110, and so forth.

Figure 6C:
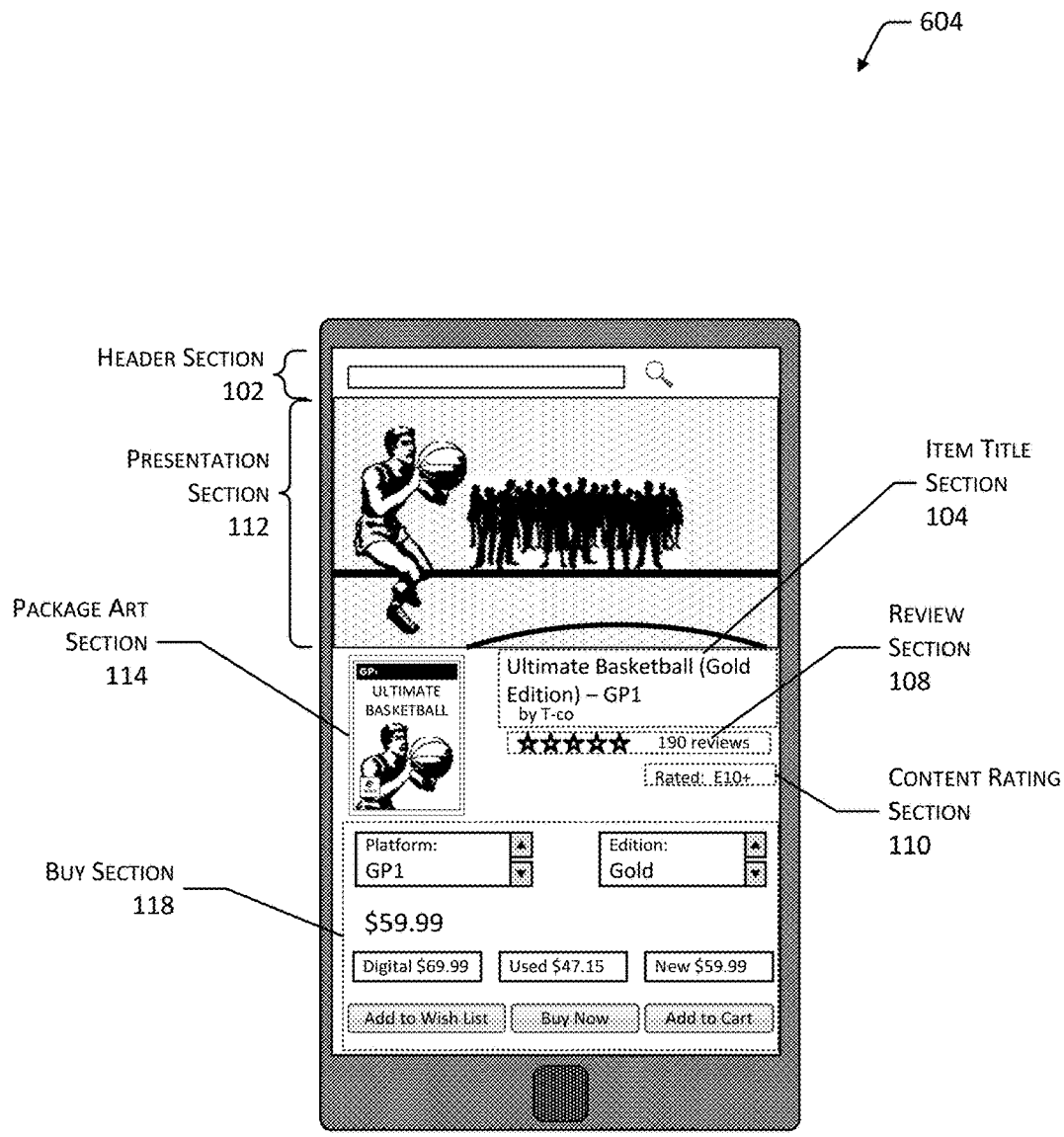
FIG. 6C depicts another user interface presented by the media device, according to one implementation.

FIG. 6C depicts another user interface 604 presented by the media device 128, according to one implementation. In this implementation, the package art section 114 is depicted below the presentation section 112. Below the presentation section 112 and to the right of the package art section 114 are the item title section 104, review section 108, and the content rating section 110. Below the package art section 114 is the buy section 118.

Figure 7:
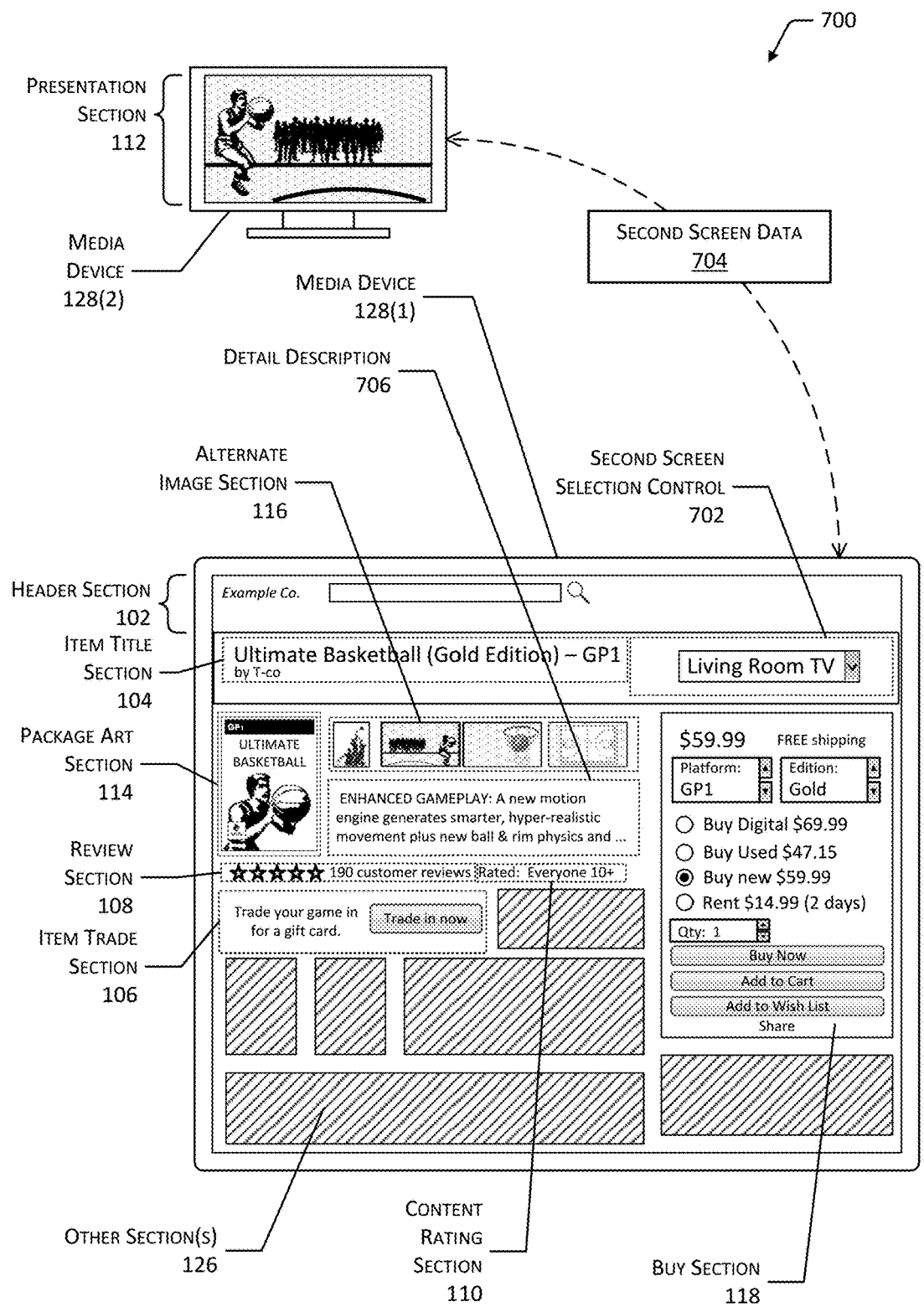
FIG. 7 depicts a first user interface presented by a first media device to display the presentation section and a second user interface presented by a second media device to present other sections, according to one implementation.

FIG. 7 depicts a scenario 700 in which a portion of the user interface is presented on a first media device 128(1) and a second portion of the user interface is presented on a second media device 128(2). In some implementations, it may be advantageous to present the user interface across multiple media devices 128.

In this illustration, the first portion of the user interface is presented on a first media device 128(1). For example, the first media device 128(1) may comprise a smart phone, tablet computer, laptop, desktop computer, and so forth. The first portion of the user interface may include one or more of the header section 102, the item title section 104, the item trade section 106, the review section 108, the content rating section 110, the package art section 114, the alternate image section 116, the buy section 118, other sections 126, and so forth.

The second portion of the user interface is presented on the second media device 128(2). For example, the second media device 128(2) may comprise a television, set-top box coupled to a television, desktop computer, game console, and so forth. The second portion of the user interface may comprise the presentation section 112 described above. For example, the presentation section 112 may fill the display of the second media device 128(2).

The first portion of the user interface may include a second screen selection control 702. The user may utilize the second screen selection control 702 to select a particular media device 128. For example, the second screen selection control 702 in this illustration has been used to select the living room television.

Second screen data 704 may be provided to the second media device 128(2). For example, the second screen data 704 may comprise video data sent to the second media device 128(2) from the first media device 128(1), from another computing device such as a server that is in communication with the second media device 128(2), and so forth. In one implementation, the second screen data 704 may comprise a link, network address, or other information that is provided to the second media device 128(2). The second media device 128(2) may use the second screen data 704 to retrieve or otherwise access content for presentation by the second media device 128(2).

The first portion of the user interface presented by the first media device 128(1) may include additional information. For example, a detail description 706 may be presented that includes additional information about the item.

In the implementation depicted here in FIG. 7, the user is able to readily see the content displayed within the presentation section 112 while also seeing the information in the other sections as described.

Figure 8:
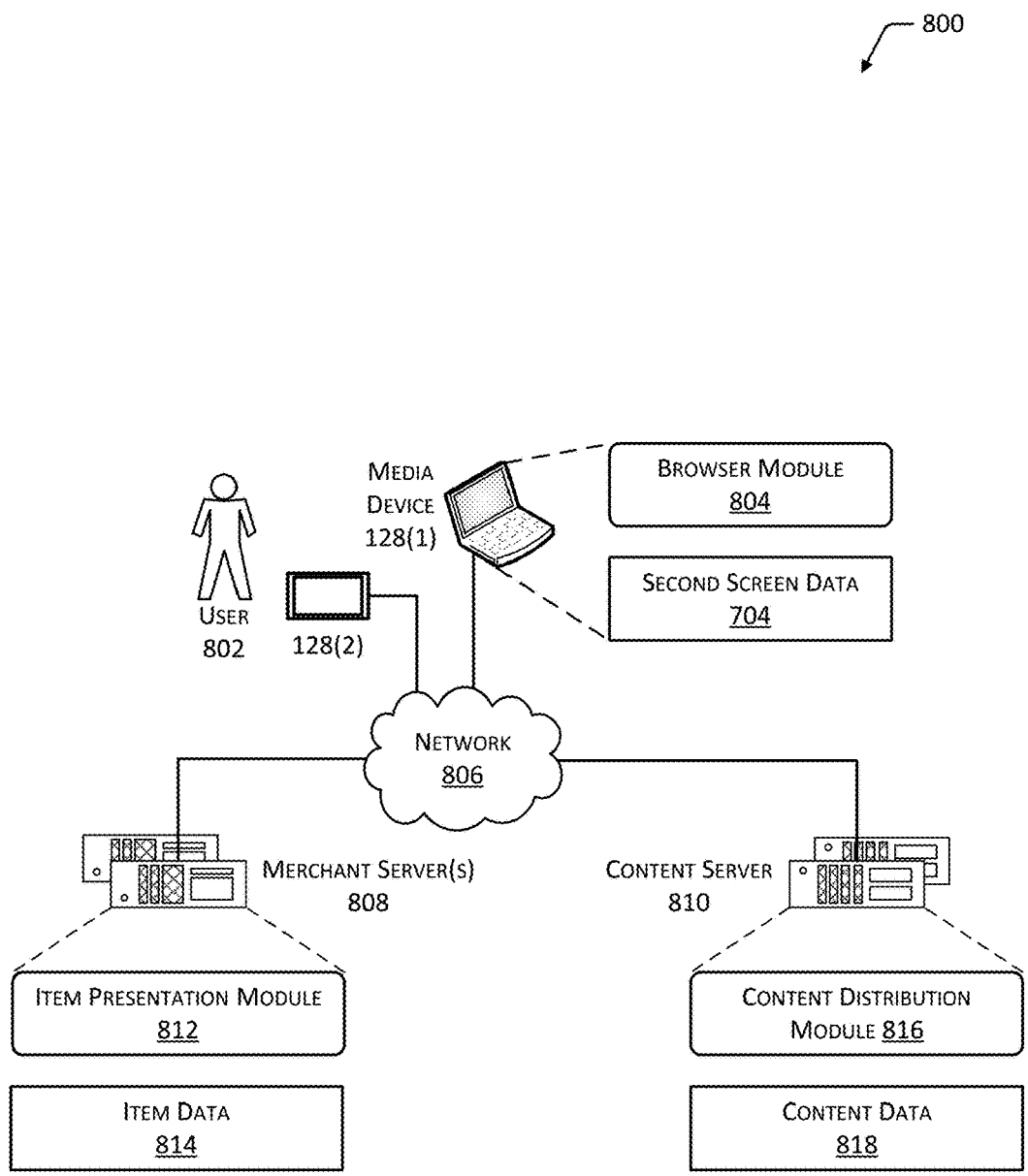
FIG. 8 illustrates a block diagram of the media device, a merchant server, and a content server, according to one implementation.

FIG. 8 illustrates a block diagram 800 of the media device 128 and other devices that are part of the system, according to one implementation. As described above, a user 802 may utilize one or more media devices 128(1), 128(2), . . . , 128(D). In some implementations, the media devices 128 may execute an application, such as a browser module 804. For example, the browser module 804 may comprise Internet Explorer from Microsoft Corp, Safari from Apple, Inc., Firefox from Mozilla Foundation, and so forth.

The media devices 128 may connect to one or more networks 806, which in turn may connect to one or more servers such as a merchant server 808, content server 810, and so forth.

The network 806 may include private networks such as an institutional or personal intranet, public networks such as the Internet, or a combination thereof. The network 806 may utilize wired technologies (e.g., wires, fiber optic cables, and so forth), wireless technologies (e.g., radio frequency, infrared, acoustic, optical, and so forth), or other connection technologies. The network 806 is representative of any type of communication network, including one or more of data networks or voice networks. The network 806 may be implemented using wired infrastructure (e.g., copper cable, fiber optic cable, and so forth), a wireless infrastructure (e.g., cellular, microwave, satellite, and so forth), or other connection technologies.

The servers may be configured to execute one or more modules or software applications. The merchant server 808 may include an item presentation module 812 and item data 814. The item presentation module 812 may be used to provide information used by one or more of the sections described above. The item data 814 may include information about a particular item, such as the title, price, quantity on hand, content rating data, and so forth. In some implementations the item data 814 may include other information such as the package art images, alternate image data, and so forth.

The content server 810 may include a content distribution module 816 and content data 818. The content data 818 may comprise information such as video content, executable program instructions, and so forth. The content data 818 is associated with an item. In some implementations, the item may consist only of content data 818, such as in the case of an electronic book, video that is delivered via streaming only, online gaming, and so forth. The content distribution module 816 may be configured to deliver content to the presentation section 112 of the user interfaces described above. For example, the content distribution module 816 may be configured to stream or initiate streaming of the content data 818 to the media device 128 for subsequent display within the presentation section 112.

During presentation of the user interfaces described above, information presented in sections such as the item title section 104 and the review section 108 may be provided by the merchant server 808, while content associated with the item that is displayed within the presentation section 112 may be provided by the content server 810. The various sections in the user interface may be provided by different merchant servers 808, content servers 810, and so forth. One or more of these merchant servers 808, the content servers 810, or both may be operated by different entities associated with different domains. For example, the item trade section 106 may present information from a merchant server 808 of a first domain, the review section 108 may present information from a merchant server 808 of a second domain, the content rating section 110 may present information from a merchant server 808 of a third domain, the presentation section 112 may present video from a content server 810 in a fourth domain, the alternate image section 116 may present content from another content server 810 in a fifth domain, and so forth. The information from these various domains may be used to provide the user interface as described herein. When presented in the user interface, the various sections may be formatted or otherwise processed to maintain a consistent look and feel. For example, the user may be unaware that the different sections are provided from these different domains. This may allow for the user to more easily make an online purchase without being diverted from a particular site maintained by an online merchant. The entirety of issued U.S. Pat. No. 8,626,665 entitled "Payment service capable of being integrated with merchant sites" by inventor Hong Q. Bui, which was filed on Dec. 17, 2012, and published on Jan. 7, 2014, is hereby incorporated by reference.

As described above with regard to FIG. 7, the second screen data 704 may be used to direct the display of content on the second media device 128(2). For example, the second screen data 704 may comprise information that is used by the second media device 128(2) to retrieve content from the content server 810.

Figure 9:
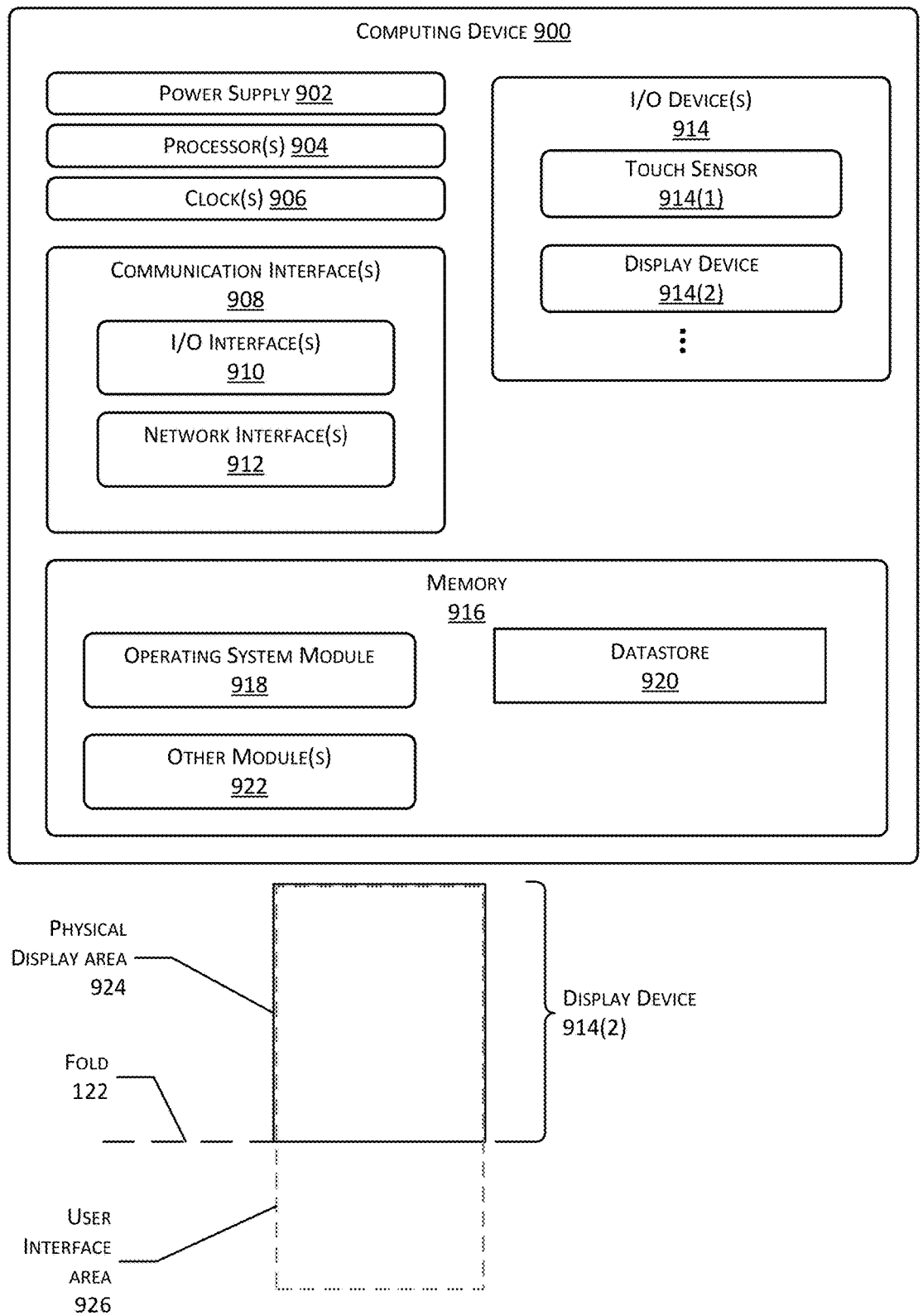
FIG. 9 is a block diagram of a computing device within the scope of the present disclosure, according to one implementation.

FIG. 9 is a block diagram of a computing device 900 within the scope of the present disclosure, according to one implementation. One or more of the media device 128, merchant server 808, content server 810, and so forth, may comprise a computing device 900. Any type of computing device 900 and any number of networked computing devices 900 may perform the implementations described herein individually or in coordination with one another.

One or more power supplies 902 may be configured to provide electrical power suitable for operating the components of the computing device 900. In some implementations, the power supply 902 may include a rechargeable battery, fuel cell, photovoltaic cell, power conditioning circuitry, and so forth.

The computing device 900 may include one or more hardware processor(s) 904 (processors) configured to execute one or more stored instructions. The processor(s) 904 may include one or more cores. One or more clocks 906 may provide information indicative of date, time, ticks, and so forth. For example, the processor(s) 904 may use data from the clock 906 to generate a timestamp, trigger a preprogrammed action, and so forth.

The computing device 900 may include one or more communication interfaces 908, such as input/output (I/O) interfaces 910, network interfaces 912, and so forth. The communication interfaces 908 may enable the computing device 900, or components of the computing device 900, to communicate with other computing devices 900 or components of the other computing devices 900. The I/O interfaces 910 may include interfaces such as Inter-Integrated Circuit (I2C), Serial Peripheral Interface (SPI) bus, Universal Serial Bus (USB) as promulgated by the USB Implementers Forum, RS-232, and so forth.

The I/O interface(s) 910 may couple to one or more I/O devices 914. The I/O devices 914 may include any manner of input device or output device associated with the computing device 900. For example, I/O devices 914 may include touch sensors 914(1), keyboards, mouse devices, microphones, image sensors (e.g., cameras), scanners, display devices 914(2), speakers, haptic devices, printers, and so forth. In some implementations, the I/O devices 914 may be physically incorporated with the computing device 900 or may be externally placed.

The network interfaces 912 may be configured to provide communications between the computing device 900 and other devices, such as the I/O devices 914, routers, access points, and so forth. The network interfaces 912 may include devices configured to couple to one or more networks including local area networks (LANs), wireless LANs, wide area networks (WANs), wireless WANs, and so forth. For example, the network interfaces 912 may include devices compatible with Ethernet, asynchronous transfer mode (ATM), frame relay, Wi-Fi, Bluetooth, ZigBee, Z-Wave, 2G, 4G, LTE, and so forth.

The computing device 900 may include one or more busses or other internal communications hardware or software that allows for the transfer of data between the various modules and components of the computing device 900.

As shown in FIG. 9, the computing device 900 may include one or more memories 916. The memory 916 may include one or more non-transitory computer-readable storage media (CRSM). The CRSM may be any one or more of an electronic storage medium, a magnetic storage medium, an optical storage medium, a quantum storage medium, a mechanical computer storage medium, and so forth. The memory 916 may provide storage of computer-readable instructions, data structures, program modules, and other data for the operation of the computing device 900. A few example modules are shown stored in the memory 916, although the same functionality may alternatively be implemented in hardware, firmware, or as a system on a chip (SoC).

The memory 916 may include one or more operating system (OS) modules 918. The OS module 918 may be configured to manage hardware resource devices such as the I/O interfaces 910, the network interfaces 912, the I/O devices 914, and to provide various services to applications or modules executing on the processors 904. The OS module 918 may implement a variant of the FreeBSD operating system as promulgated by the FreeBSD Project; UNIX or a UNIX-like operating system; a variation of the Linux operating system as promulgated by Linus Torvalds; the Windows operating system from Microsoft Corporation of Redmond, Wash., USA; or other operating systems.

A data store 920 and one or more modules may also be stored in the memory 916. The modules may be executed as foreground applications, background tasks, daemons, and so forth. The data store 920 may use a flat file, database, linked list, tree, executable code, script, or other data structure to store information. Information stored in the data store 920 may include but is not limited to the item data 814, content data 818, and so forth. In some implementations, the data store 920 or a portion of the data store 920 may be distributed across one or more other devices including other computing devices 900, network attached storage devices, and so forth. In some implementations, other modules 922 may include the browser module 804, item presentation module 812, content distribution module 816, and so forth.

In some implementations, the data store 920 may also store user interface information. The user interface information may comprise one or more instructions, executable code, or other data that is used at least in part to generate the user interface as described herein. For example, the user interface information may include HTML files, CSS files, and so forth.

In different implementations, different computing devices 900 may have different capabilities or capacities. For example, the merchant server 808 may have significantly more processor 904 capability and memory 916 capacity compared to the processor 904 capability and memory 916 capacity of the media device 128.

In some implementations, there may be a difference between a physical display area 924 and a user interface area 926. The physical display area 924 comprises a portion of the area of the display device 914(2) that is usable to present output. For example, the physical display area 924 may include that portion of the display device 914(2) that is visible to the user and not otherwise obscured by an object such as a bezel. In comparison, the user interface area 926 comprises an area within which the user interface may be deemed to extend. The user interface area 926 as depicted here may extend beyond the physical display area 924. The portion of the user interface area 926 that extends below the fold 122 may be accessed by scrolling, swiping or another user input event that moves the portion of the user interface that is presented on the display.

Figure 10:
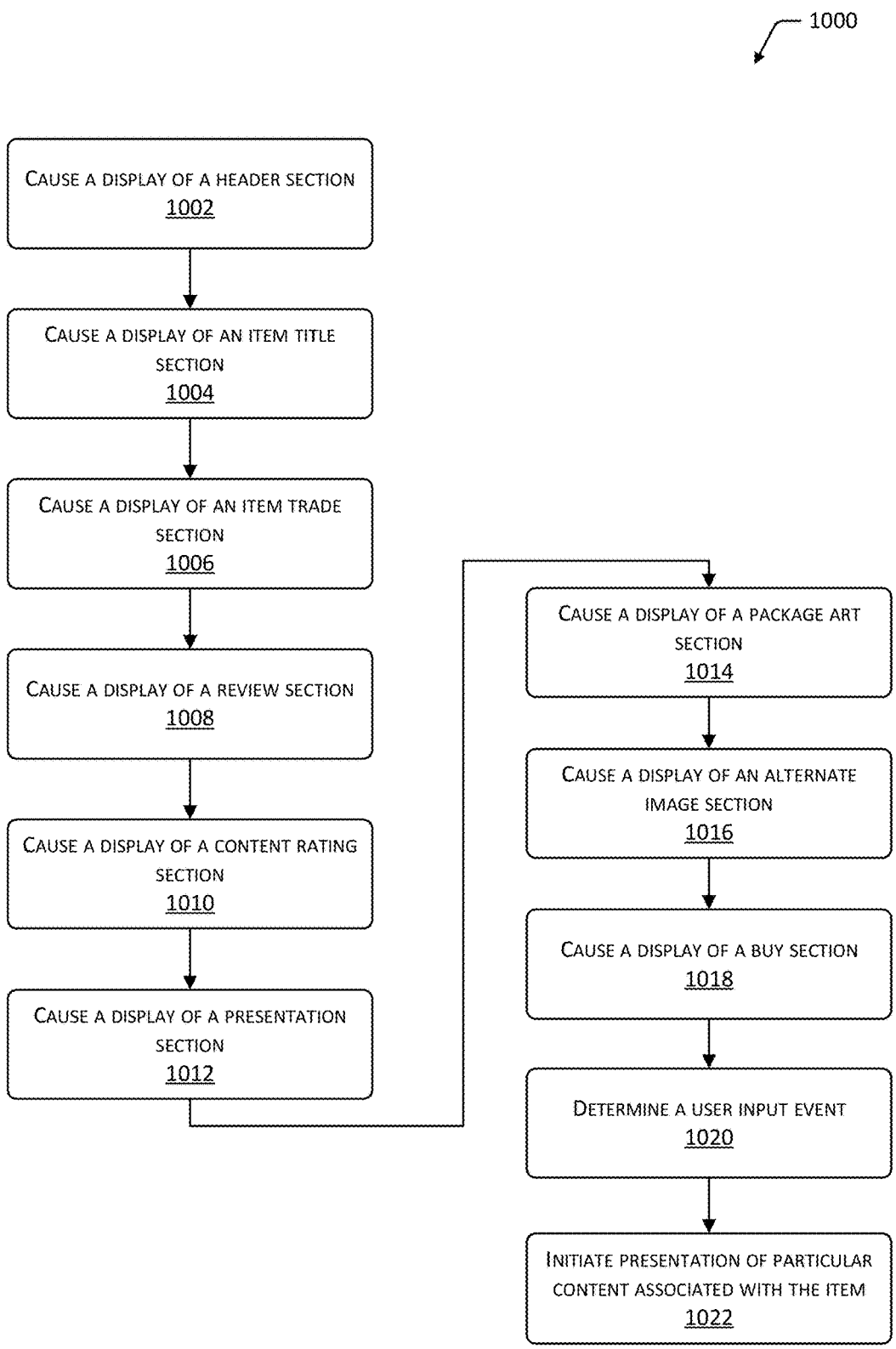
FIG. 10 is a flow diagram of a process of displaying a user interface, according to one implementation.

FIG. 10 is a flow diagram 1000 of a process of displaying a user interface, according to one implementation. The process may be implemented by one or more of the media device 128, merchant server 808, the content server 810, or another computing device 900.

At 1002, the system causes display of a header section 102. Causing display may include one or more of generating, sending, receiving, rendering, or otherwise processing instructions configured to produce a particular output from a display device 914(2).

At 1004, the system causes display of an item title section 104. The item title section 104 may encompass a first area of a user interface.

At 1006, the system causes display of an item trade section 106. The item trade section 106 may encompass a second area of the user interface. The second area is proximate to and arranged to a right of the item title section 104.

At 1008, the system causes display of a review section 108. The review section 108 may encompass a third area of the user interface. The third area is proximate to and arranged below the first area.

At 1010, the system causes display of a content rating section 110. The content rating section 110 may encompass a fourth area of the user interface. The fourth area is proximate to and arranged below the first area and proximate to and arranged to a right of the third area.

At 1012, the system causes display of a presentation section 112. As described above, this display may include presentation of content such as video clips, stream video, slideshows, and so forth. The presentation section 112 may encompass a fifth area of the user interface. The fifth area is proximate to and arranged below the second area, proximate to and arranged below the third area, and proximate to and arranged below the fourth area.

The presentation area 112 may extend a full width of the user interface with a height configured to maintain a predetermined aspect ratio associated with content. For example, the presentation section 112 may extend from a left edge of the user interface to a right edge of the user interface. The content associated with the item may comprise video content that is displayed with a frame rate of at least fifteen frames per second.

At 1014, the system causes display of a package art section 114. The package art section 114 may be proximate to a left edge of the presentation section 112 and may overlay at least a portion of the presentation section 112.

At 1016, the system causes display of an alternate image section 116. The alternate image section 116 may encompass a sixth area of the user interface. The sixth area is proximate to and arranged below the fifth area.

At 1018, the system causes display of a buy section 118 or a compact buy section 202. The buy section 118 may encompass a seventh area of the user interface. In some implementations the buy section 118 overlays at least a portion of the presentation section 112. The buy section 118 may be at least partially transparent with respect to the content presented in the presentation section 112. The seventh area is positioned to a right of a center of the presentation section and overlays at least a portion of the presentation section 112.

At 1020, a user input event is determined. For example, the OS module 918 may detect a touch event on the touch sensor 914(1) that corresponds to a particular section, such as the presentation section 112.

At 1022, presentation of particular content associated with the items is initiated. For example, responsive to the user input event, an interactive gaming session may be instantiated. The interactive gaming session may then be presented within the presentation section 112. The user may then play using the interactive gaming session within the user interface.

In another implementation, the user input event determined at 1020 may be indicative of a particular one or more of additional images presented within the alternate image section 116. For example, the alternate images may be different pieces of content or sections within a piece of content that is associated with the item. A portion of the content is determined that corresponds to the user input event. For example, a particular image may reference a particular point within a video clip. The display device 914(2) may then be caused to display the determined portion within the presentation section 112. In this way, the user may navigate amidst the content that is associated with the item.

As described above, the user interface may be presented above the fold 122. For example, the user interface has a user interface area 926 that is greater than a physical display area 924 of the display device, and the seven areas are presented within the portion of the user interface area 926 that corresponds to the physical display area 924.

The arrangement of the different areas described above may be modified. For example, the item trade section 106 may be located below the presentation section 112.

Figure 11:
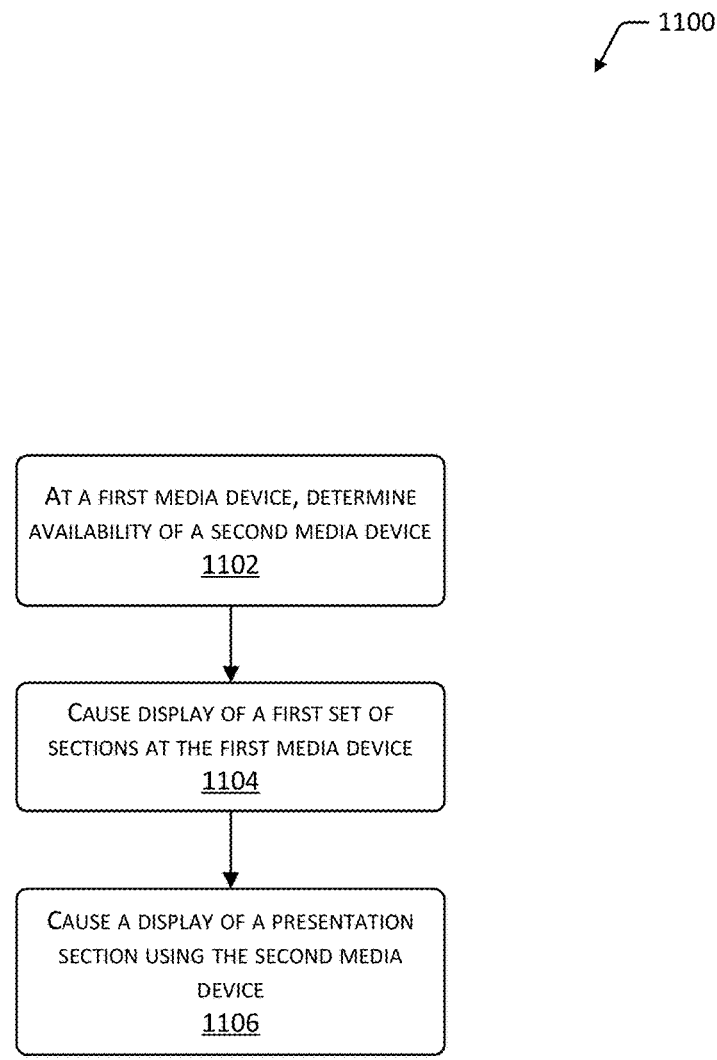
FIG. 11 is a flow diagram of a process of displaying a user interface including a presentation section on a first media device and other sections on a second media device, according to one implementation.

FIG. 11 is a flow diagram 1100 of a process of displaying a user interface including a presentation section 112 on a first media device 128(1) and other sections on a second media device 128(2), according to one implementation. The process may be implemented by one or more of the media device 128, merchant server 808, the content server 810, or another computing device 900.

At 1102, at a first media device 128(1) availability of a second media device 128(2) for display is determined. For example, the first media device 128(1) may poll for available media devices 128, request information from a server, establish a connection with the second media device 128(2), and so forth to determine the availability.

At 1104, the system causes display of one or more of the review section 108, the buy section 118, or the sections other than the presentation sections 112 at the first media device 128(1).

At 1106, the system causes display of the presentation section 112 at the second media device 128(2). For example, the presentation section 112 may display the content associated with the item.

Figure 12:
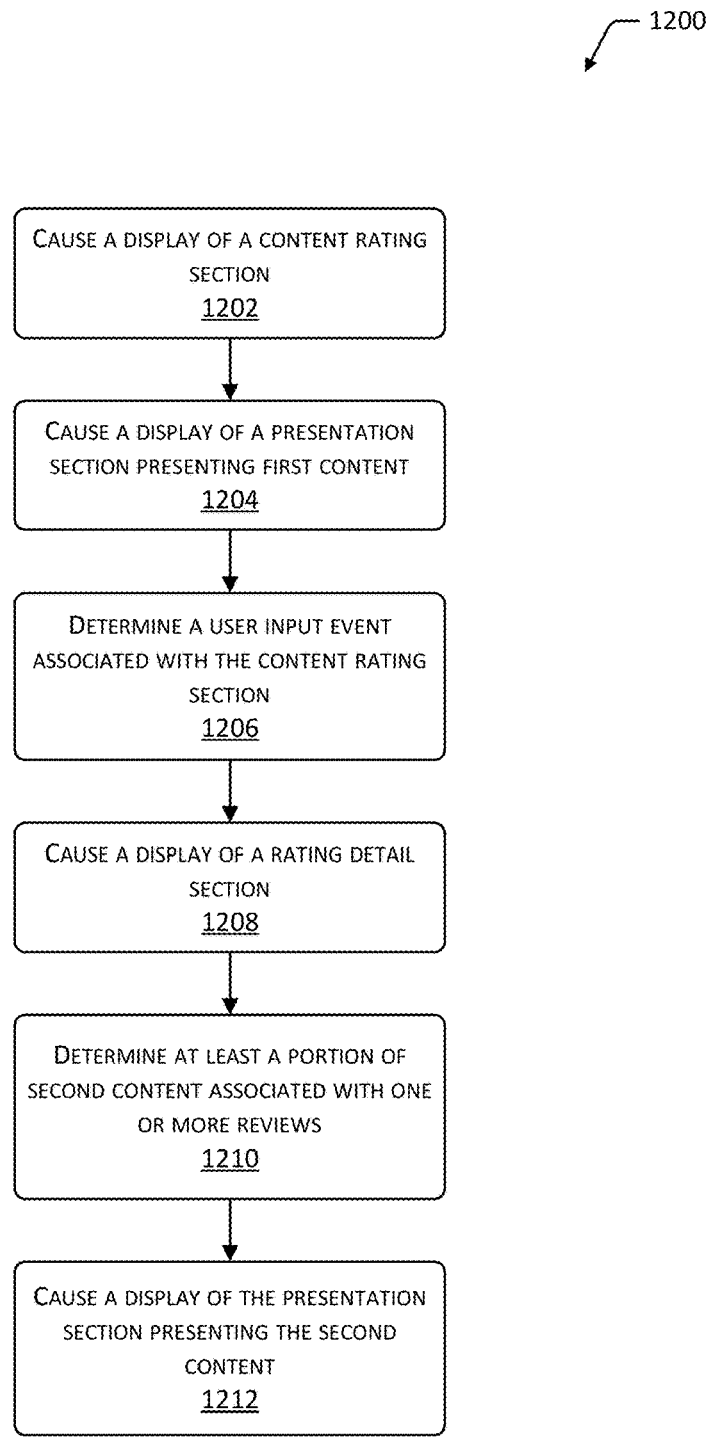
FIG. 12 is a flow diagram of a process of displaying a user interface, according to one implementation.

FIG. 12 is a flow diagram of a process 1200 of displaying a user interface, according to one implementation. The process may be implemented by one or more of the media device 128, merchant server 808, the content server 810, or another computing device 900.

At 1202, the system causes display of the content rating section 110.

At 1204, the system causes display of the presentation section 112 presenting first content.

At 1206, the system determines a user input event associated with the content rating section 110. For example, the OS module 918 may determine a touch event based on input from a touch sensor 914(1) that occurs within the boundaries of the content rating section 110 is present on the display device 914(2).

At 1208, the system causes display of a rating detail section 302.

At 1210, the system determines a least a portion of second content that is associated with one or more reviews. The one or more reviews may be associated with the information presented within the rating detail section 302.

At 1212, the system causes display of the presentation section 112 presenting the second content. For example, a portion of the second content may comprise a video clip that is associated with a particular review comment. Upon the user touching the visual representation of the review as presented on the display device 914(2), the system may present within the presentation section 112 a video clip that is associated with that review comment.

In other implementations, other information may be presented. For example, a user input event associated with the content rating section 110 may result in a determination of one or more portions of the content associated with the content rating. The display device 914(2) may then be caused to display the one or more portions in the presentation section 112. In this way, the user may be able to see portions of the content that were used to determine a particular rating that is associated with the item.

Figure 13:
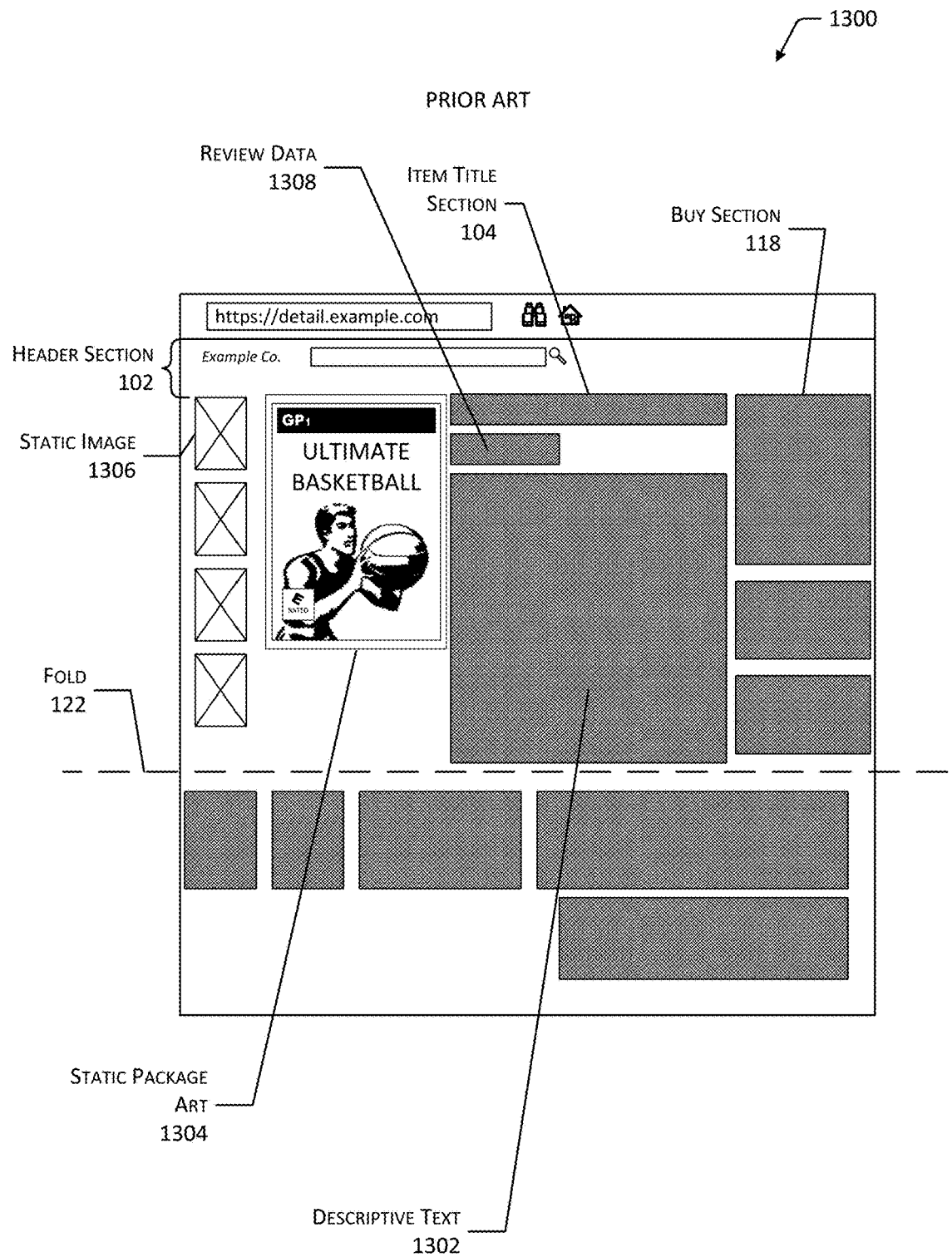
FIG. 13 depicts an example of a user interface in the prior art.

FIG. 13 depicts an example of a prior art user interface 1300. In this illustration, a large block of descriptive text 1302 containing various details about the item dominates the user interface. Static package art 1304 is presented, showing an enlarged image of the package art. To the left of the static package art 1304 are various static images 1306, such as screenshots from gameplay of an interactive videogame or different views of the item. Also presented in the user interface 1300 may be the item title section 104, some review data 1308, and the buy section 118. The review data 1308 may comprise information such as number of stars or text of a customer review.

This user interface 1300 presents a great deal of information, but may require that the user read through the various blocks of text in order to gain a sense of the item. At that point, the user then must locate in the user interface 1300 the buy section 118 in order to initiate purchase of the product.

In comparison, the user interface such as that described in FIG. 1 presents information such as the review section 108 and the content rating section 110 adjacent to the presentation section 112 which is playing video content associated with the item that helps the user gather information about the item more quickly and easily than the user having to readjust their gaze and think about the blocks of text in the user interface 1300. Also, the buy section 118 of FIG. 1 overlays the presentation section 112. This particular arrangement and combination of sections allows users to more efficiently and accurately make a purchasing decision when contemplating making an online purchase, rental, or other acquisition of an item. As such, the user interfaces as described with regard to FIGS. 1-12 improve the ability of the computer to display information and interact with the user.

By using the user interfaces and the techniques described in this disclosure, the user may be able to more quickly and efficiently assess an item for possible purchase or addition to a wish list. This user interface presents many pieces of information to the user in a way that is easily comprehensible and navigable.

The processes discussed in this disclosure may be implemented in hardware, software, or a combination thereof. In the context of software, the described operations represent computer-executable instructions stored on one or more computer-readable storage media that, when executed by one or more hardware processors, perform the recited operations. Generally, computer-executable instructions include routines, programs, objects, components, data structures, and the like that perform particular functions or implement particular abstract data types. Those having ordinary skill in the art will readily recognize that certain steps or operations illustrated in the figures above may be eliminated, combined, or performed in an alternate order. Any steps or operations may be performed serially or in parallel. Furthermore, the order in which the operations are described is not intended to be construed as a limitation.

Embodiments may be provided as a software program or computer program product including a non-transitory computer-readable storage medium having stored thereon instructions (in compressed or uncompressed form) that may be used to program a computer (or other electronic device) to perform processes or methods described in this disclosure. The computer-readable storage medium may be one or more of an electronic storage medium, a magnetic storage medium, an optical storage medium, a quantum storage medium, and so forth. For example, the computer-readable storage media may include, but is not limited to, hard drives, floppy diskettes, optical disks, read-only memories (ROMs), random access memories (RAMs), erasable programmable ROMs (EPROMs), electrically erasable programmable ROMs (EEPROMs), flash memory, magnetic or optical cards, solid-state memory devices, or other types of physical media suitable for storing electronic instructions. Further, embodiments may also be provided as a computer program product including a transitory machine-readable signal (in compressed or uncompressed form). Examples of transitory machine-readable signals, whether modulated using a carrier or unmodulated, include, but are not limited to, signals that a computer system or machine hosting or running a computer program can be configured to access, including signals transferred by one or more networks. For example, the transitory machine-readable signal may comprise transmission of software by the Internet.

Separate instances of these programs can be executed on or distributed across any number of separate computer systems. Although certain steps have been described as being performed by certain devices, software programs, processes, or entities, this need not be the case, and a variety of alternative implementations will be understood by those having ordinary skill in the art.

Additionally, those having ordinary skill in the art will readily recognize that the techniques described above can be utilized in a variety of devices, environments, and situations. Although the subject matter has been described in language specific to structural features or methodological acts, it is to be understood that the subject matter defined in the appended claims is not necessarily limited to the specific features or acts described. Rather, the specific features and acts are disclosed as exemplary forms of implementing the claims.

What is claimed is:

1. A system comprising:
a display device;
a memory storing computer-executable instructions; and
a hardware processor configured to execute the computer-executable instructions to:
cause the display device to display an item title section including a title associated with an item, wherein the item title section encompasses a first area of a user interface;
cause the display device to display an item trade section indicating trade-in information associated with the item, wherein the item trade section encompasses a second area of the user interface, and further wherein the second area is proximate to and arranged to a right of the item title section;
cause the display device to display a review section indicative of reviews associated with the item, wherein the review section encompasses a third area of the user interface, and further wherein the third area is proximate to and arranged below the first area;
cause the display device to display a content rating section indicative of a content rating associated with the item, wherein the content rating section encompasses a fourth area of the user interface, and further wherein the fourth area is proximate to and arranged below the first area and proximate to and arranged to a right of the third area;
cause the display device to display a presentation section to play video content, wherein the presentation section encompasses a fifth area of the user interface, and further wherein the fifth area is proximate to and arranged below the second area, proximate to and arranged below the third area, and proximate to and arranged below the fourth area;

cause the display device to display an alternate image section indicative of one or more additional images associated with the item, wherein the alternate image section encompasses a sixth area of the user interface, and further wherein the sixth area is proximate to and arranged below the fifth area; and cause the display device to display a buy section comprising information associated with purchase of the item, wherein the buy section encompasses a seventh area of the user interface, and further wherein the seventh area is positioned to a right of a center of the presentation section and overlays at least a portion of the presentation section.

2. The system of claim 1, wherein the presentation section extends a full width of the user interface with a height configured to maintain a predetermined aspect ratio associated with the video content, and further wherein the video content is displayed with a frame rate of at least fifteen frames per second.

3. The system of claim 1, wherein the user interface has a user interface area that is greater than a physical display area of the display device, and wherein the first through the seventh areas are presented within a portion of the user interface area that corresponds to the physical display area.

4. A method comprising:
causing a display device to display a user interface including a review section comprising a summary of viewer ratings that is indicative of an average rating of an item by other users;

causing the display device to display as part of the user interface a presentation section to present content of the item, wherein the presentation section extends from a left edge of the user interface to a right edge of the user interface;

causing the display device to display as part of the user interface a package art section to present an image of package art associated with the item; and causing the display device to display as part of the user interface a buy section comprising a purchase selection control for selecting a version of the item and a price field indicative of a cost to acquire rights to the version of the item selected using the purchase selection control, wherein the buy section overlays at least a portion of the presentation section.

5. The method of claim 4, further comprising a first point of the presentation section that is proximate to an upper right corner of the presentation section and a second point of the buy section that is proximate to an upper right corner of the buy section, wherein the buy section is anchored at the second point to the first point.

6. The method of claim 4, wherein the buy section is at least partially transparent with respect to the content presented in the presentation section.

7. The method of claim 4, the content presented in the presentation section comprising one or more of: a video clip representative of the item or a video stream obtained from use of the item.

8. The method of claim 4, wherein the content associated with the item comprises a video clip and further comprising:
determining a user input event associated with the presentation section;

instantiating an interactive gaming session associated with the item; and presenting the interactive gaming session in the presentation section.

9. The method of claim 4, wherein the buy section comprises a first mode and a second mode, the first mode having a first area during display and the second mode having a second area during display that is greater than the first area;

determining a user input event associated with the buy section; and transitioning display between the first mode and the second mode responsive to the user input event.

10. The method of claim 4, further comprising:
transitioning the buy section and the package art section between a first mode and a second mode, the first mode comprising:
the causing the display device to display as part of the user interface the buy section to overlay the at least a portion of the presentation section; and
the causing the display device to display as part of the user interface the package art section to overlay the at least a portion of the presentation section; and
the second mode comprising:
the causing the display device to display as part of the user interface the buy section to not overlay the presentation section; and
the causing the display device to display as part of the user interface the package art section to not overlay the presentation section.

11. The method of claim 4, further comprising:
causing the display device to display an alternate image section indicative of one or more additional images associated with the item;
determining a user input event associated with the alternate image section;
determining a portion of the content associated with the item corresponding to the user input event; and
causing the display device to display the portion in the presentation section.

12. The method of claim 4, further comprising:
causing the display device to display a content rating section indicative of a content rating associated with the item;
determining a user input event associated with the content rating section;
determining a portion of the content associated with the content rating; and
causing the display device to display the portion in the presentation section.

13. The method of claim 4, the buy section further comprising:
a shipping control to select how the item will be delivered, and
a quantity control to select a quantity of the item.

14. The method of claim 4, further comprising:
causing the display device to display as part of the user interface an item trade section indicating trade-in options associated with the item.

15. A method comprising:
causing display of a review section comprising a summary of viewer ratings that is indicative of an average rating of an item by other users;
causing display of a presentation section to present content of the item, wherein the presentation section extends from a first edge proximate to a left side of a display device to a second edge proximate to a right side of the display device;

causing the display device to display a package art section to present an image of package art associated with the item, wherein the package art section overlays at least a portion of the presentation section; and causing display of a buy section comprising a purchase selection control for selecting a version of the item and a price field indicative of a cost to acquire rights to the version of the item selected using the purchase selection control.

16. The method of claim 15, further comprising:

at a first media device, determining availability of a second media device;

causing display of the review section and the buy section at the first media device; and causing display of the presentation section at the second media device.

17. The method of claim 15, wherein the buy section overlays at least a portion of the presentation section, and further wherein the buy section is at least partially transparent with respect to the content presented in the presentation section.

18. The method of claim 15, further comprising:

determining a user input event associated with the presentation section; and presenting, in the presentation section, an interactive gaming session.

19. The method of claim 15, wherein the buy section comprises a first mode and a second mode, the first mode having a first area during display and the second mode having a second area during display, wherein the second area is greater than the first area; and determining a user input event associated with the buy section; and transitioning display between the first mode and the second mode responsive to the user input event.

20. The method of claim 15, further comprising:

causing the display device to display a content rating section indicative of a content rating associated with the item;

determining a user input event associated with the content rating section;

determining a portion of the content associated with the content rating; and causing the display of the portion in the presentation section.

\* \* \* \* \*